US012085235B2

(12) United States Patent
Kubista et al.

(10) Patent No.: US 12,085,235 B2
(45) Date of Patent: Sep. 10, 2024

(54) DEFUEL PRIORITY PANEL

(71) Applicant: OPAL FUELS LLC, White Plains, NY (US)

(72) Inventors: Daniel Kubista, St. Charles, MN (US); Martin Edward Lucas, Granite Bay, CA (US); Claudiu Dorian Pruteanu, Kasson, MN (US)

(73) Assignee: OPAL FUELS, LLC, White Plains, NY (US)

( * ) Notice: Subject to any disclaimer, the term of this patent is extended or adjusted under 35 U.S.C. 154(b) by 0 days.

(21) Appl. No.: 18/167,548

(22) Filed: Feb. 10, 2023

(65) Prior Publication Data

US 2023/0265971 A1 Aug. 24, 2023

Related U.S. Application Data

(63) Continuation of application No. 16/926,090, filed on Jul. 10, 2020, now Pat. No. 11,619,351.

(Continued)

(51) Int. Cl.
*F17C 7/00* (2006.01)
*F17C 5/06* (2006.01)
*B60K 15/03* (2006.01)

(52) U.S. Cl.
CPC ............. *F17C 7/00* (2013.01); *F17C 5/06* (2013.01); *B60K 15/03006* (2013.01); *B60K 2015/03019* (2013.01); *B60K 2015/03026* (2013.01); *F17C 2205/0323* (2013.01); *F17C 2205/0338* (2013.01); *F17C 2221/033* (2013.01); *F17C 2223/0123* (2013.01); *F17C 2225/0123* (2013.01); *F17C 2227/0157* (2013.01);

(Continued)

(58) Field of Classification Search
CPC ........ F17C 7/00; F17C 5/06; F17C 15/03006; F17C 2015/03019; F17C 2015/03026; F17C 2205/0323; F17C 2205/0338; F17C 2221/033; F17C 2223/0123; F17C 2225/0123; F17C 2227/0157; F17C 2227/03; F17C 2265/061; F17C 2270/0139
See application file for complete search history.

(56) References Cited

U.S. PATENT DOCUMENTS 8,875,750 B2 * 11/2014 Ding ..................... B65B 1/20
141/82
10,598,133 B2 * 3/2020 Oversby ............ F02M 21/0224
(Continued)

OTHER PUBLICATIONS

International Search Report dated Oct. 2, 2020 from corresponding International Patent Application No. PCT/US2020/041616, 3 pages.

(Continued)

*Primary Examiner* — Nicolas A Arnett
(74) *Attorney, Agent, or Firm* — Ruggiero McAllister & McMahon LLC

(57) ABSTRACT

Systems and methods are provided for a combined defuel and priority panel for a fueling station. The defuel and priority panel is configured to defuel a compressed natural gas (CNG) vehicle and direct the defueled gas to fuel other CNG vehicles at the panel fueling and defueling site. The defuel and priority panel is also configured to store defueled gas in defuel storage tanks, which can then be used to later fuel CNG vehicles.

20 Claims, 16 Drawing Sheets

Related U.S. Application Data

(60) Provisional application No. 62/873,667, filed on Jul. 12, 2019.

(52) U.S. Cl.
CPC .... *F17C 2227/03* (2013.01); *F17C 2265/061* (2013.01); *F17C 2270/0139* (2013.01)

(56) References Cited

U.S. PATENT DOCUMENTS

| | | | | |
|---|---|---|---|---|
| 11,619,351 B2 * | 4/2023 | Kubista | ............. | F17C 7/00 141/65 |
| 2006/0042273 A1 * | 3/2006 | Morris | ............. | F17C 11/007 62/46.1 |
| 2013/0192701 A1 * | 8/2013 | Poorman | ............. | F17C 5/02 137/565.17 |
| 2014/0033738 A1 * | 2/2014 | Billig | ............. | B61C 17/12 62/48.1 |
| 2014/0283921 A1 * | 9/2014 | Lippinois | ............. | B64D 33/02 137/15.1 |
| 2015/0020918 A1 * | 1/2015 | Macaluso | ............. | F17C 7/00 141/82 |
| 2015/0112506 A1 * | 4/2015 | Hanlin | ............. | B60K 15/03006 137/259 |
| 2015/0211684 A1 * | 7/2015 | Santos | ............. | F17C 11/007 137/1 |
| 2017/0130901 A1 * | 5/2017 | Sloan | ............. | F17C 5/06 |
| 2018/0274727 A1 * | 9/2018 | Won | ............. | F17C 5/06 |
| 2020/0017787 A1 * | 1/2020 | Foody | ............. | B01D 53/1487 |
| 2020/0041072 A1 * | 2/2020 | Werlen | ............. | F25B 9/008 |
| 2020/0164840 A1 * | 5/2020 | Smith | ............. | B60S 5/02 |
| 2021/0003256 A1 * | 1/2021 | Fukunaga | ............. | F17C 5/007 |

OTHER PUBLICATIONS

International Search Report dated Oct. 2, 2020 from corresponding International Patent Application No. PCT/US2020/041616, 10 pages.
International Preliminary Examination Report dated Jan. 22, 2022 from corresponding International Patent Application No. PCT/US2020/041616, 8 pages.

* cited by examiner

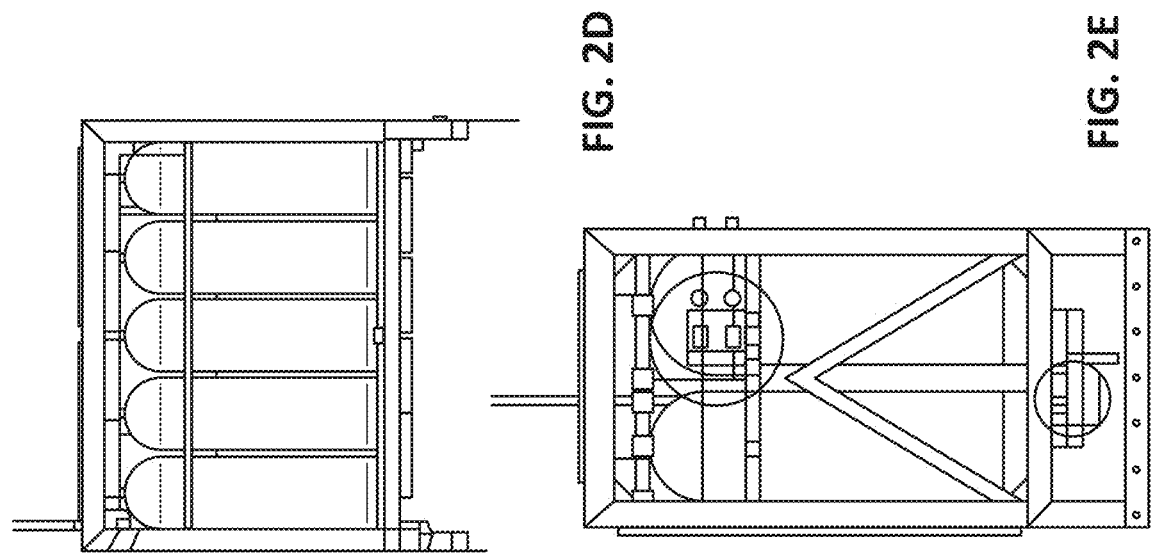
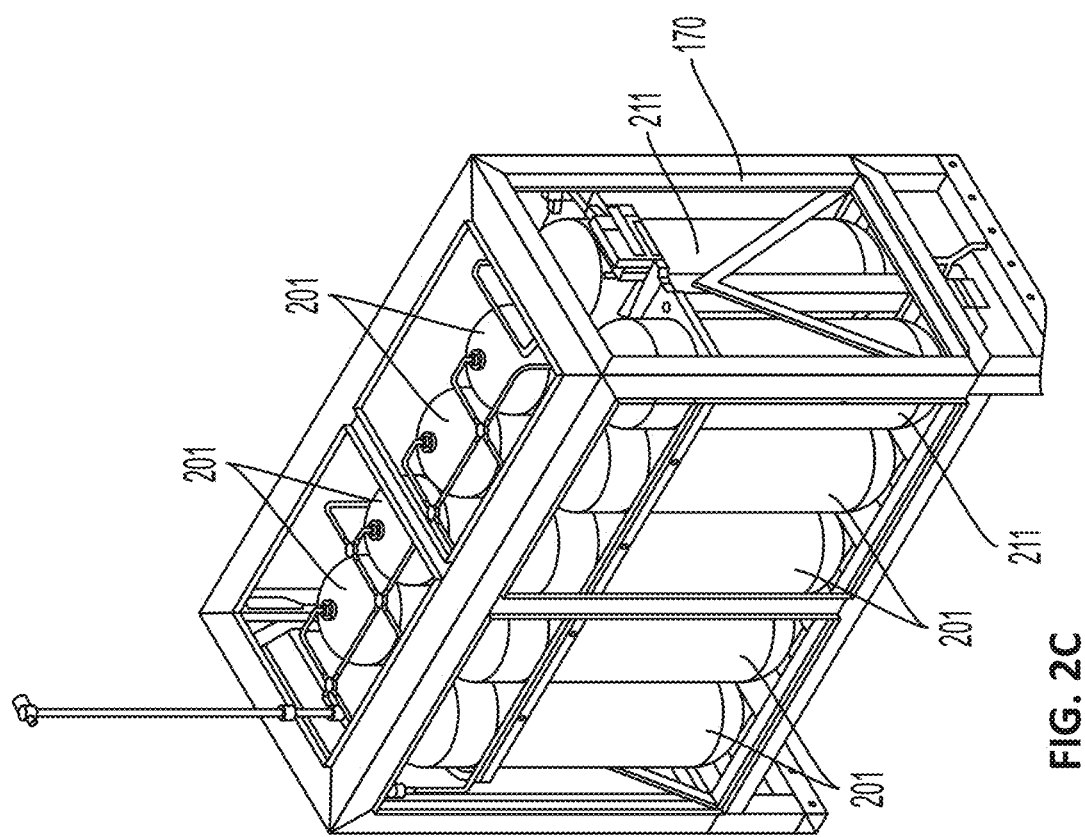

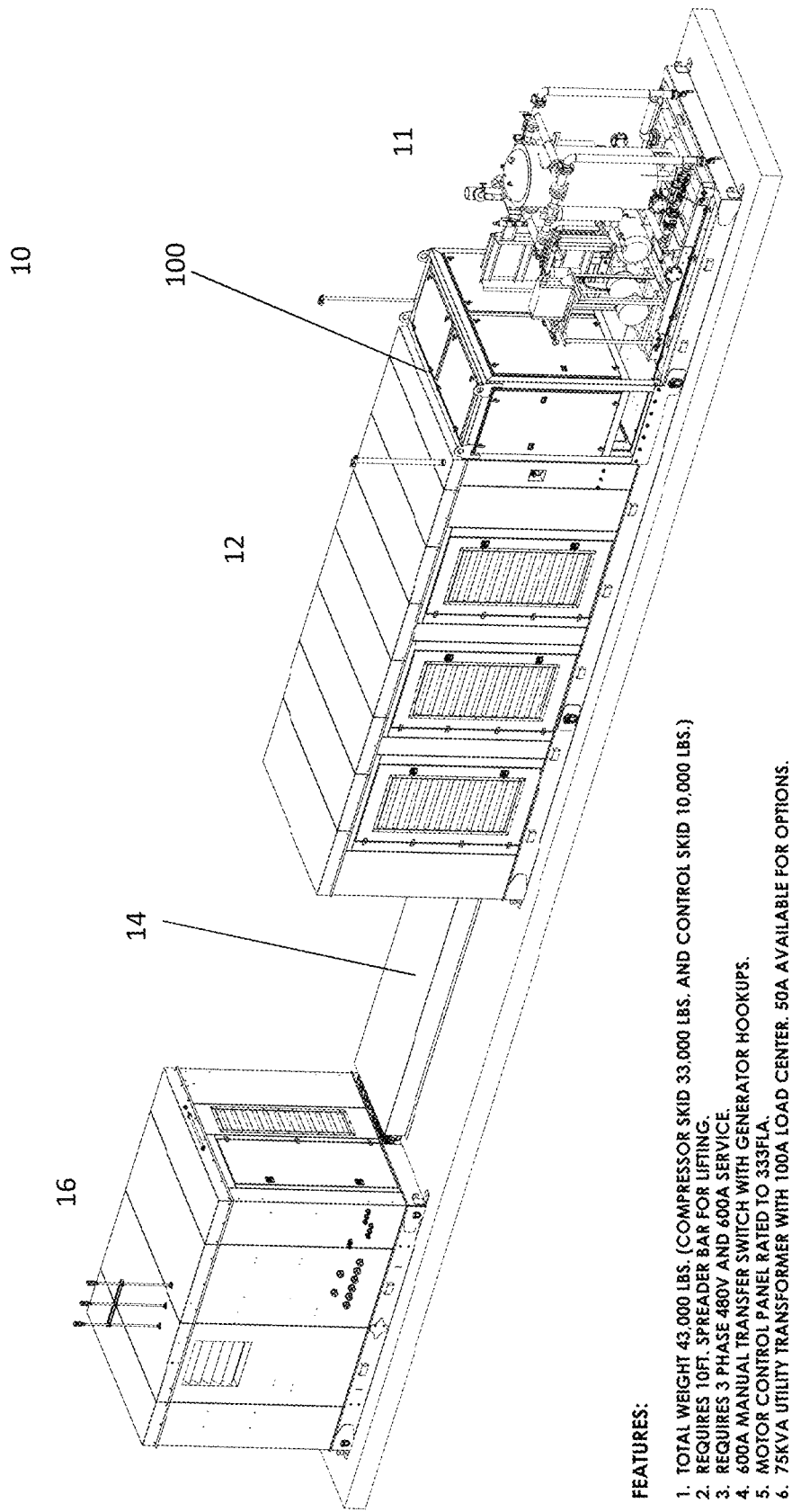

DEFUEL PRIORITY PANEL

CROSS REFERENCE TO RELATED APPLICATIONS

The present application claims priority to U.S. Provisional Patent Application No. 62/873,667 entitled Defuel Priority Panel, filed on Jul. 12, 2019, and U.S. patent application Ser. No. 16/926,090, filed on Jul. 10, 2020, the entirety of each of which is incorporated by reference herein.

DESCRIPTION OF RELATED ART

Field of the Disclosure

The present disclosure relates to a compressed natural gas fueling station.

Description of Related Art

A priority panel is a panel having valves to direct gas flow to areas of compressed natural gas (CNG) fuel demand for CNG vehicles and vessels. Conventional CNG fueling stations use compressors 15 to compress gas into fuel tanks of trucks and trailers until they are full. Typical CNG vehicle tanks are filled to 3600 psi at 70° F.

When CNG vehicles need to be serviced, the CNG tanks need to be depressurized to safely perform the work. Currently, this gas is vented to atmosphere. CNG is proving to be a viable clean fuel and is gaining popularity. With that comes a responsibility to the environment to reclaim as much raw CNG gas as possible instead of venting the gas to atmosphere. In addition, reclaiming defuel CNG significantly reduce operating costs and can be beneficial for legal and regulatory obligations and incentives.

Defueling vehicles has been attempted by many with little success. Moreover, conventional defueling for servicing is done completely separately from refueling at stations or utilities with a priority panel.

As vehicles need to be safely depressurized prior to performing service work, what is needed is to reclaim that fuel and be reused/recompressed into other vehicles. What is needed is a priority panel/with defueling capability that can also defuel a CNG vehicle into onboard storage vessels.

SUMMARY

Disclosed are embodiments of systems and methods for a combined defuel and priority panel for a fueling station. The defuel and priority panel is configured to defuel a CNG vehicle and direct the defueled gas to fuel other CNG vehicles at the panel fueling and defueling site. The defuel and priority panel is also configured to store defueled gas in defuel storage tanks, which can then be used to later fuel or refuel CNG vehicles and CNG vessels.

BRIEF DESCRIPTION OF THE DRAWINGS

Embodiments are illustrated in the figures of the accompanying drawings, which are meant to be exemplary and not limiting, and in which like references are intended to refer to like or corresponding things.

FIGS. 2A-2E illustrate a priority and defuel panel station including defuel storage tanks.

FIGS. 7A-7C show an embodiment of a modular Compressed Natural Gas station.

DETAILED DESCRIPTION OF EMBODIMENTS

Figure 1A:
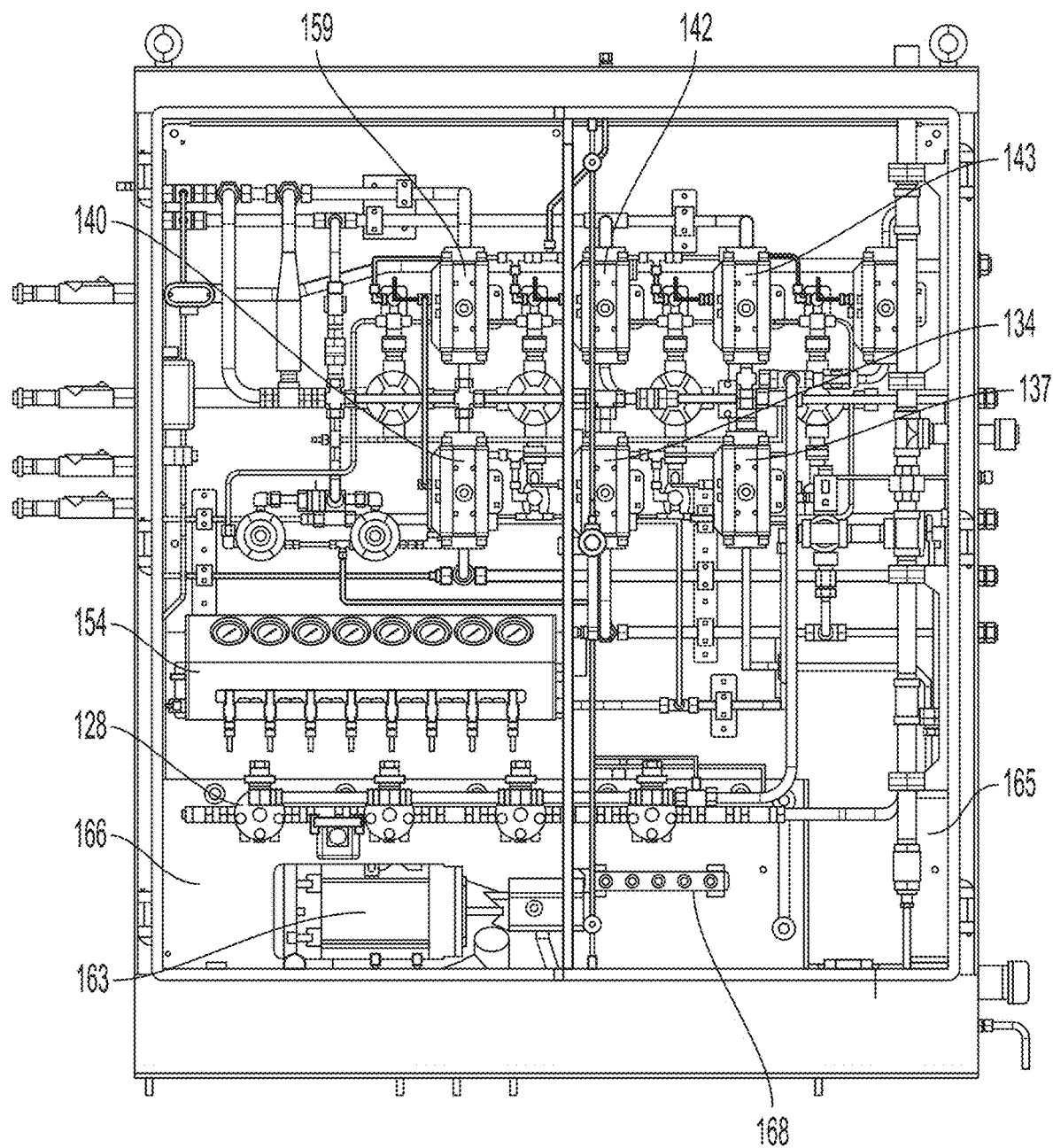
FIGS. 1A-1C illustrate a priority and defuel panel and gas flow lines therefor.

Various embodiments now will be described more fully hereinafter with reference to the accompanying drawings, which form a part hereof, and which show, by way of illustration, specific embodiments by which the innovations described herein can be practiced. The embodiments can, however, be embodied in many different forms and should not be construed as limited to the embodiments set forth herein; rather, these embodiments are provided so that this disclosure will be thorough and complete, and will fully convey the scope of the embodiments to those skilled in the art. The following detailed description is, therefore, not to be taken in a limiting sense.

Throughout the specification and claims, the following terms take the meanings explicitly associated herein, unless the context clearly dictates otherwise. The term "herein" refers to the specification, claims, and drawings associated with the current application. The phrase "in an embodiment" as used herein does not necessarily refer to the same embodiment, though it can. Furthermore, the phrase "in another embodiment" as used herein does not necessarily refer to a different embodiment, although it can. Thus, as described below, various embodiments can be readily combined, without departing from the scope or spirit of the disclosure.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references.

The present disclosure will now describe exemplary embodiments of a priority and defuel panel. Embodiments disclosed herein provide a system, devices, and methods for a combined CNG fueling and defueling station.

In an embodiment, described is a defuel/priority panel system that provides an all in one solution for a CNG fueling and defueling station.

The system comprises components:
1. A lower main frame 175 to which the components are fastened 175.
2. A plurality of CNG storage vessels in an enclosed rack 170. As shown in FIGS. 2A-2E, in an embodiment, the system comprises dedicated defueling storage tanks 201 for defueling and dedicated buffer storage vessels for direct filling 211.
3. A Priority/Defuel valve panel 100. An automated system for controlling gas flow via automated valves.
4. Priority/Defuel control panel 180.
5. A high voltage control power panel 190. For example, in an embodiment, the system is configured with a 480 v control power panel.

Figure 7B:
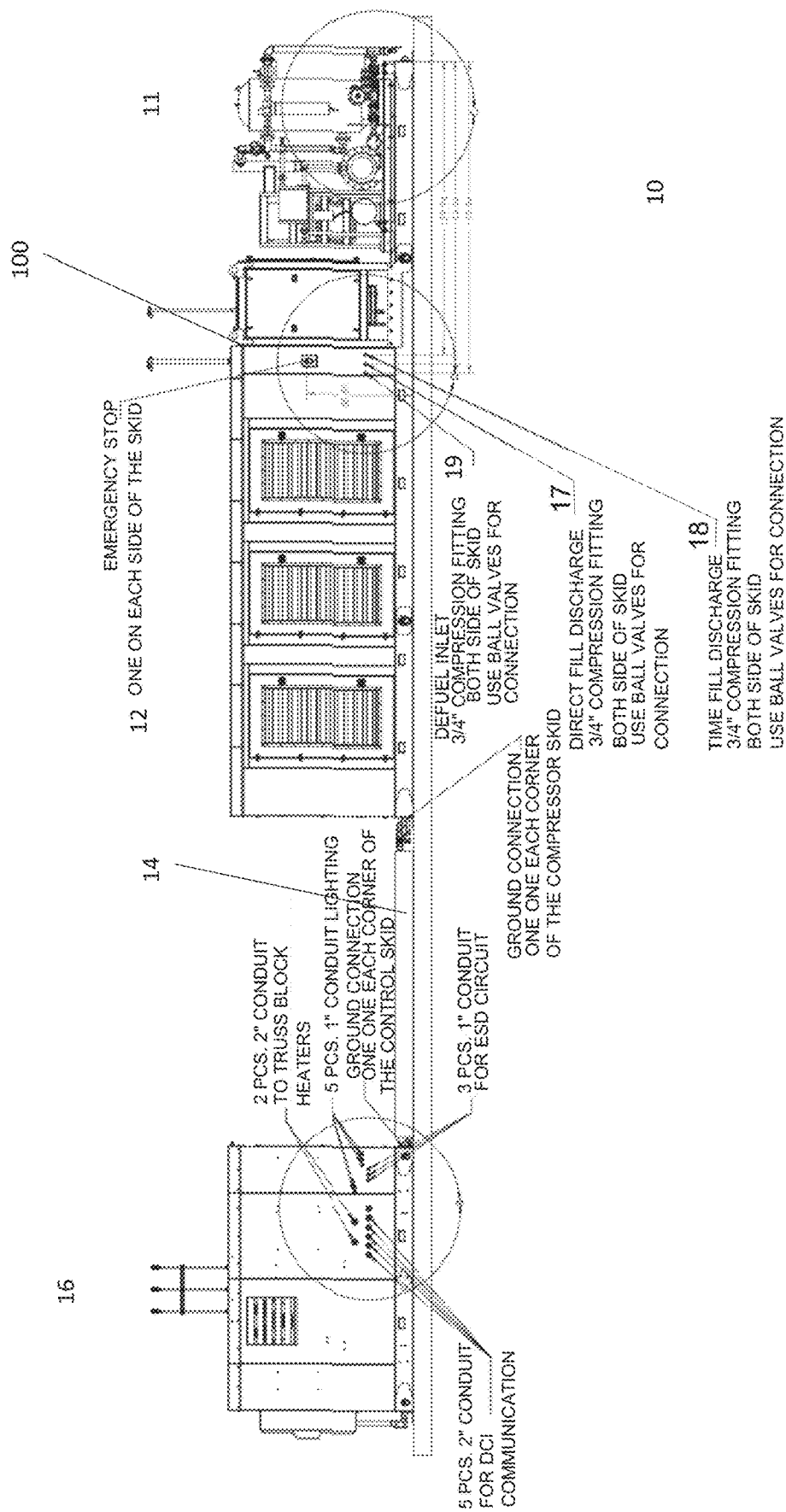
Figure 7C:
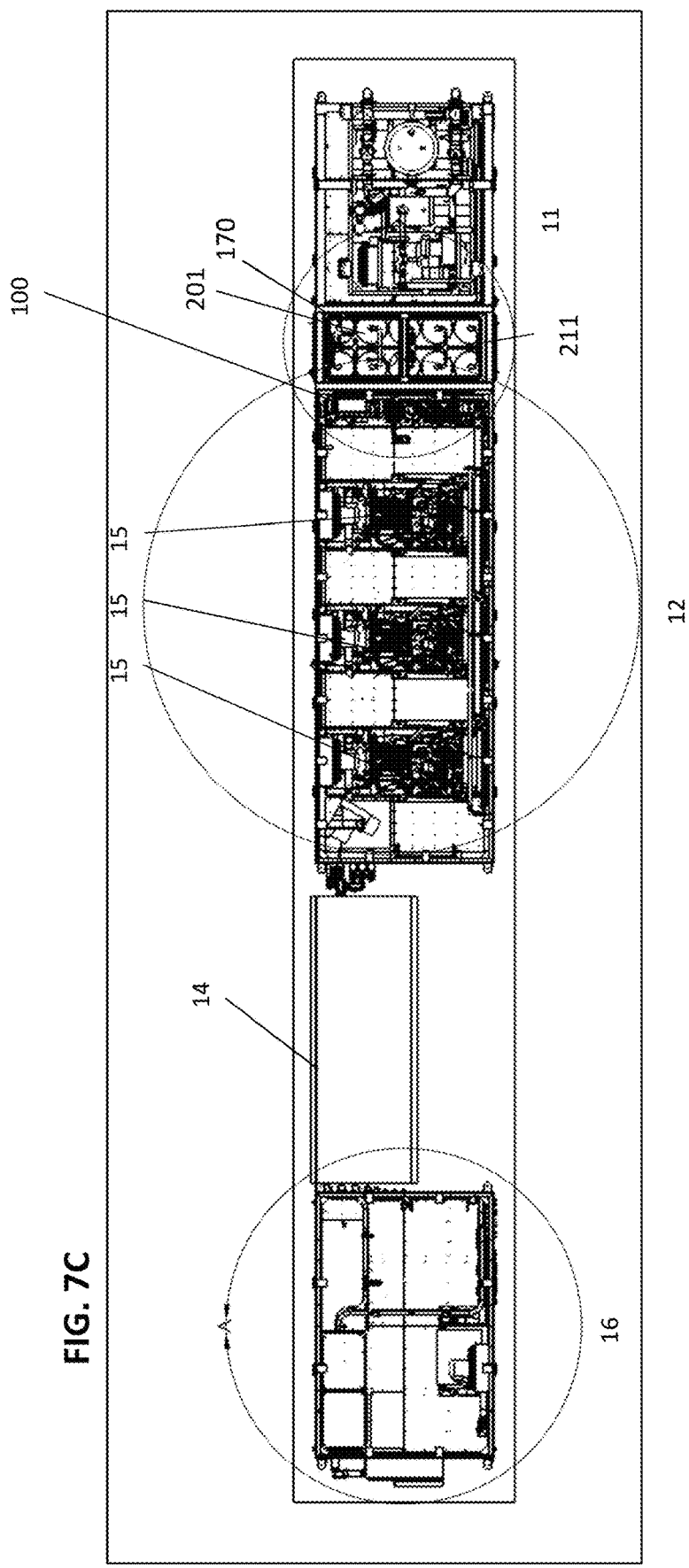

In an embodiment, Priority/Defuel panel system 100 is configured to be implemented at a compressed natural gas (CNG) fueling station. For example, in an embodiment, the Priority/Defuel panel system 100 can be provided to a conventional CNG station as known in the art to provide defueling capability thereto. In another embodiment, the Priority/Defuel panel system 100 can be configured for a modular CNG station 10. FIGS. 7A-7C show an embodiment of a modular CNG station 10, described in U.S. patent application Ser. No. 16/884,996 entitled MODULAR AND PORTABLE COMPRESSED NATURAL GAS FUELING STATION, filed on May 27, 2020, the entirety of which is incorporated by reference herein. FIGS. 7A-7B respectively show a three-quarter perspective view and side view of the modular CNG station 10. FIG. 7C shows a cutaway top plan view of the modular CNG station 10. The modular CNG station 10 comprises a control station module 16, an interface module 14, a compressor module 12 and a fueling station module 11 including the Priority/Defuel panel system 100.

Figure 1B:
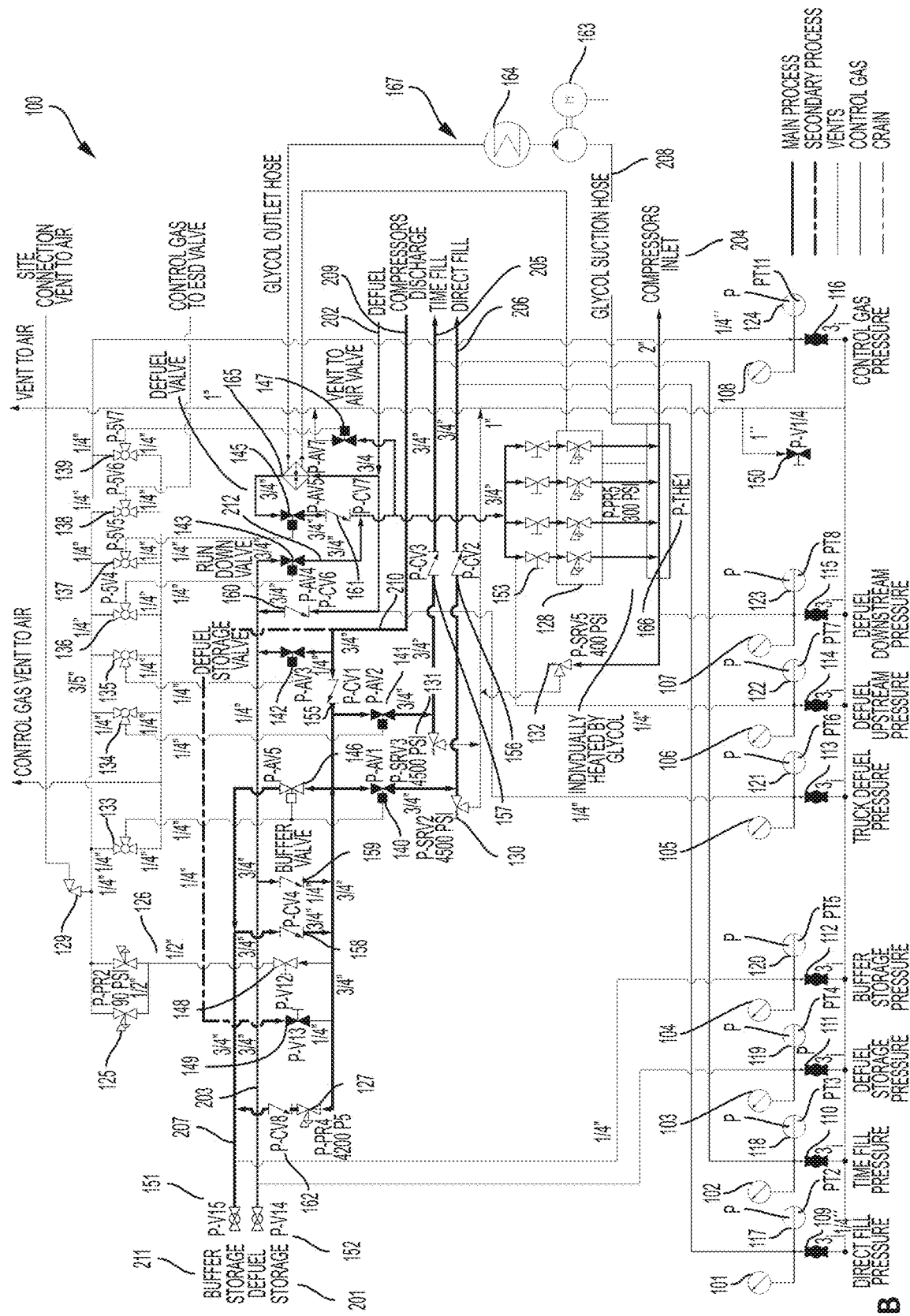
Figure 1C:
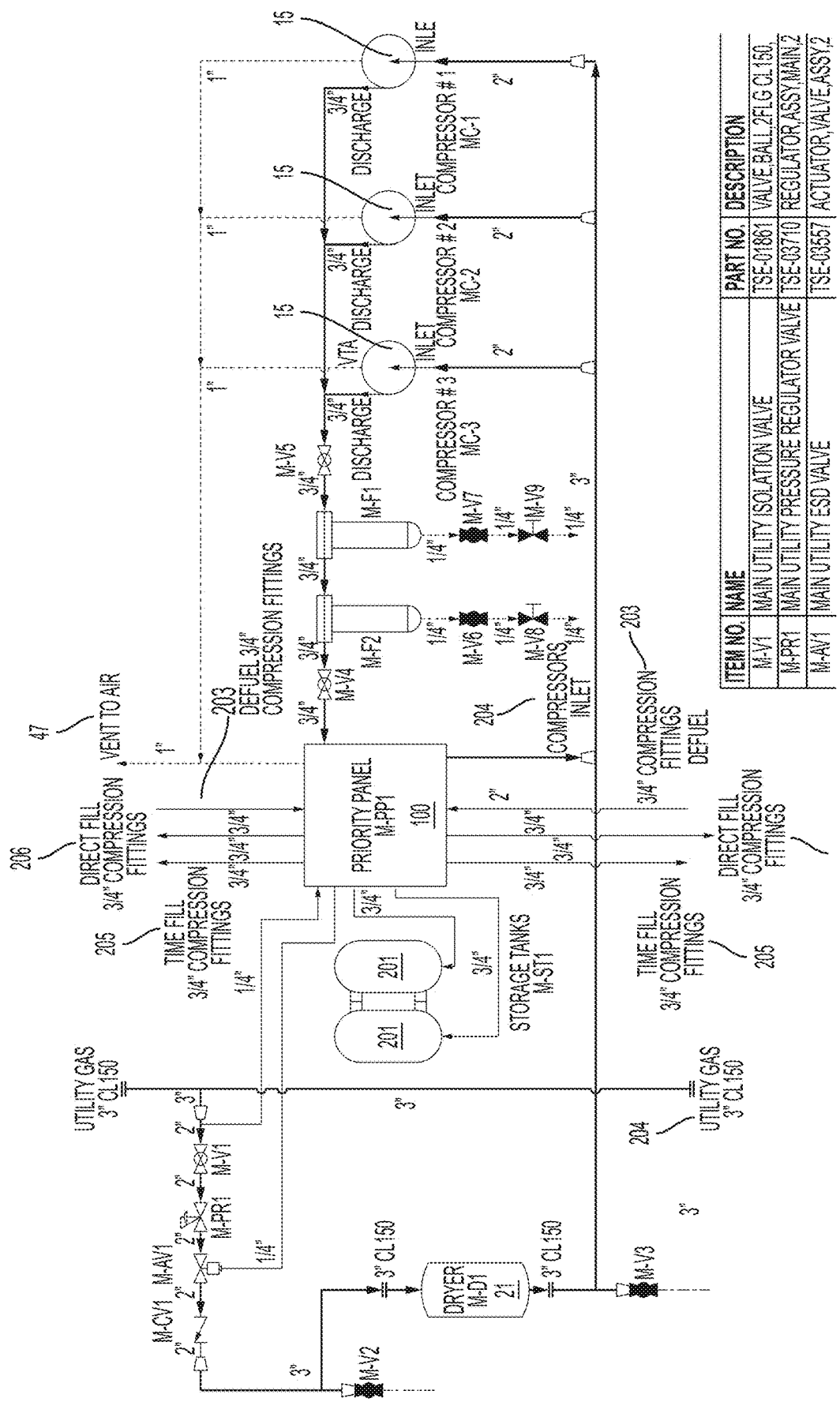
Figure 2B:
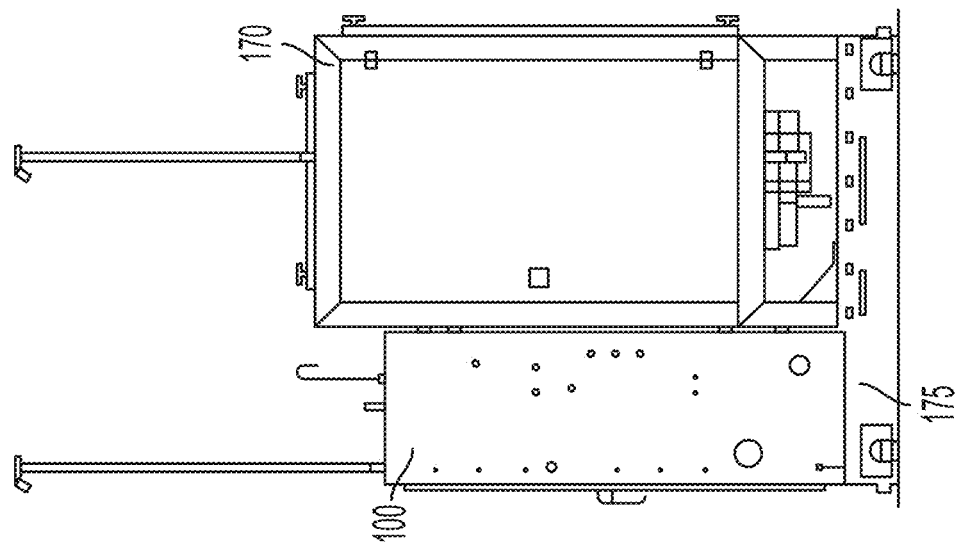
Figure 2A:
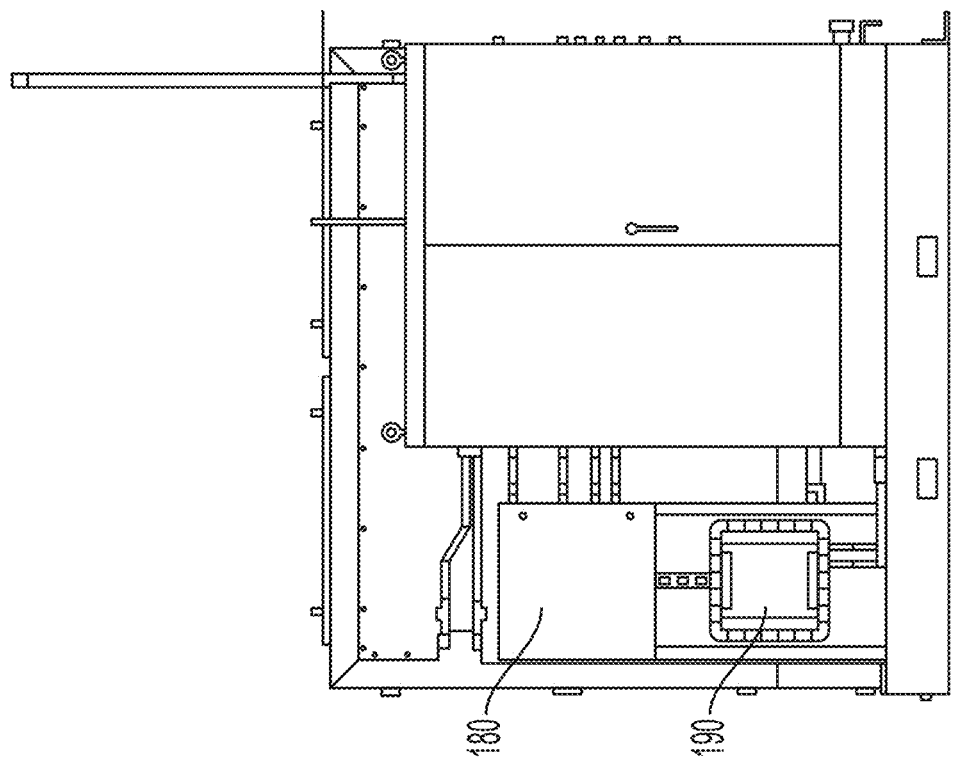

FIGS. 1A-1B shows and embodiment of a Priority/Defuel panel system 100. FIG. 1C shows an embodiment of a system for an a CNG fueling station 10 including a Priority/Defuel panel system 100. The Priority/Defuel panel system 100 is configured to direct fill a vehicle, time fill multiple vehicles at the same time, and connect a dispenser for public fueling and defueling vehicles. Priority fueling prioritizes which type of fueling needs to take place between direct fill, time fill or vehicle dispenser fueling. Direct fill refers to a dedicated fill where a single vehicle or fuel tanks therefor are filled at higher priority. During a direct fill, a direct fill valve 140 is opened, buffer valve 146 is closed and fuel from the buffer fuel storage tanks 211 and defuel storage tanks 201 fuel is delivered immediately to the vehicle tank or tanks until pressure equalizes. Time fill refers to a time regulated fill where CNG is delivered to a fleet of vehicles over time (e.g. 30-40 trucks). During a time fill, a time fill valve 141 is opened, and the fuel in the buffer fuel storage tanks 211 and defuel storage tanks 201 is delivered immediately to the vehicle tank or tanks until pressure equalizes. As shown in FIG. 1C, in an embodiment, the system is configured to pull utility gas from a utility gas station via a utility gas line 215 and route the gas through a dryer 21 to an available compressor 15 on a compressed gas line 210. The compressed gas is then filtered by a set of final discharge filters and sent to the priority panel 100 via a compressed gas line 210. The priority panel 200 then prioritizes the CNG for a direct fill outlet 17 via a direct fill line 206 for direct filling a vehicle or for a time fill outlet 18 via the time fill line 205 for time filling multiple vehicles. The fueling station is configured with a defuel inlet 19 to defuel a vehicle of CNG, compress the defueled CNG, and store the compressed CNG in a defuel storage tank 211 or deliver the CNG to a vehicle as described herein.

One problem with defueling a high-pressure vehicle tank into a low-pressure vessel is freezing. The pressure drop of the gas creates freezing of the system and freezes valves, check valves, etc. To combat this freezing, the system 100 comprises a heat exchange system 167 configured to successfully defuel an entire vehicle. The Priority/Defuel panel system 100 can defuel a completely full truck or trailer (e.g. up to 4500 psi) down to 250 psi (a requirement for service work) or as low as a utility inlet pressure. If the vehicle needs to be defueled down to zero, an automated defuel vent valve 147 can open a vent to atmosphere system vent 47 to vent the remaining pressure.

In an embodiment, the system 100 is configured to defuel a vehicle safely and use the defueled natural gas as a CNG fueling source. Note the terms "fuel", "gas", "natural gas" and CNG are used interchangeably herein. The natural gas from the defueled vehicle can be used to direct fill into another vehicle, time fill into multiple vehicles, or compressed into onboard or remote storage 201.

In an embodiment, a CNG vehicle can be connected to a remote mounted defuel hose (not shown) that is plumbed to the Priority/Defuel panel via a fuel inlet 202. In an embodiment, once connected, the Defuel/Priority system 100 can be fully automated. The system is configured with a defuel line pressure transducer 121 that senses the pressure increase on the defuel line 203. That pressure increase on the defuel line 203 starts a chain of events controlled by a PLC controller.

First, the controller activates a heat exchange system 167 configured to prevent freezing during the defuel process. In an embodiment, the heat exchange system comprises a three-stage heat and pressure regulator(s). The heat exchange system 167 comprises a glycol pump 163 and glycol heater 164. The glycol pump 163 pulls glycol from a storage tank 166, through an instant inline heater 164. This glycol is instantly heated to 180 degrees. The heated glycol is first pushed through a high-pressure heat exchanger. This heat exchanger 165 is configured to preheat the incoming gas entering the valve panel, which enters the system 100 from up to 4500 psi, depending on the vehicle pressure. After the heat exchanger 165, the gas travels through a defuel valve 145 and to a manifold 168 to corresponding glycol defuel pressure regulators 128. A glycol exit of the heat exchanger 165 feeds a manifold 168 that distributes glycol to the manifold comprising defueling pressure regulators 128.

The pressure regulators 128 are preconfigured to transfer fuel at static rate as well as to have heat applied to counteract the freezing that happens from the pressure drop. For example, the pressure reducing valves of the defuel pressure regulators 128 can depressurize fuel at 100 cubic standard feet per minute (scfm) each and are each individually heated by the glycol pump. The defuel pressure regulators 128 drop the fuel pressure from the vehicle to a set low pressure, for example from 4200 psi to 250-300 psi into a manifold, which is located inside the glycol storage tank 166. As will be appreciated, while high and low tank and defuel pressures are given with respect to exemplary CNG vehicles and vehicle tanks (e.g. 4200 psi to 250-300 psi), the defuel pressure regulators can be set to depressurize for other higher and lower pressures. After the glycol is distributed to the defuel pressure regulators 128, the glycol returns to the storage tank 166. The storage tank 166 also acts the final heat exchanger for the defuel gas system. This is the final stage of heat exchange for the gas as it travels back out of the panel and into the utility inlet 204 of the compressor(s) 15. Accordingly, the glycol heat exchange system 167 is a loop system, thus the glycol can be reused, reheated and sent back through the heat exchange process. As will be appreciated, the defuel pressure regulators 128 can be set to any low pressure setting to defuel from a high pressure to a low pressure. For example, a given vehicle's tank operation can require 300 psi to operate, so the system is configured to regulate the pressure to 300 psi. In another embodiment, the system can be configured to set to 250 psi, for example, to obtain more fuel efficiency or other benefits.

As a result, the system is configured to defuel gas from a vehicle tank back into the utility inlet line 204 of the compressor(s) (not shown) so it can be reused. A glycol suction hose 208 and pump 163 picks up cold glycol solution at bottom of the tank and reheats it for further heat exchange during rapid depressurization. Although glycol is given as an exemplary heat exchange liquid herein, other liquids with antifreeze and heat exchange properties can be employed in the heat exchange system 167. Also, although the heat exchange system 167 is shown as a three-stage system, the heat exchange system could be configured as more or less stages, two-stage or one stage system, for example, by removing one or both of the pre-heat exchanger 165 and the heat exchanger 166 at the storage tank. Or, another heat exchanger could be added, for example, to handle a larger depressurization differential over a short period of time.

Figure 3:
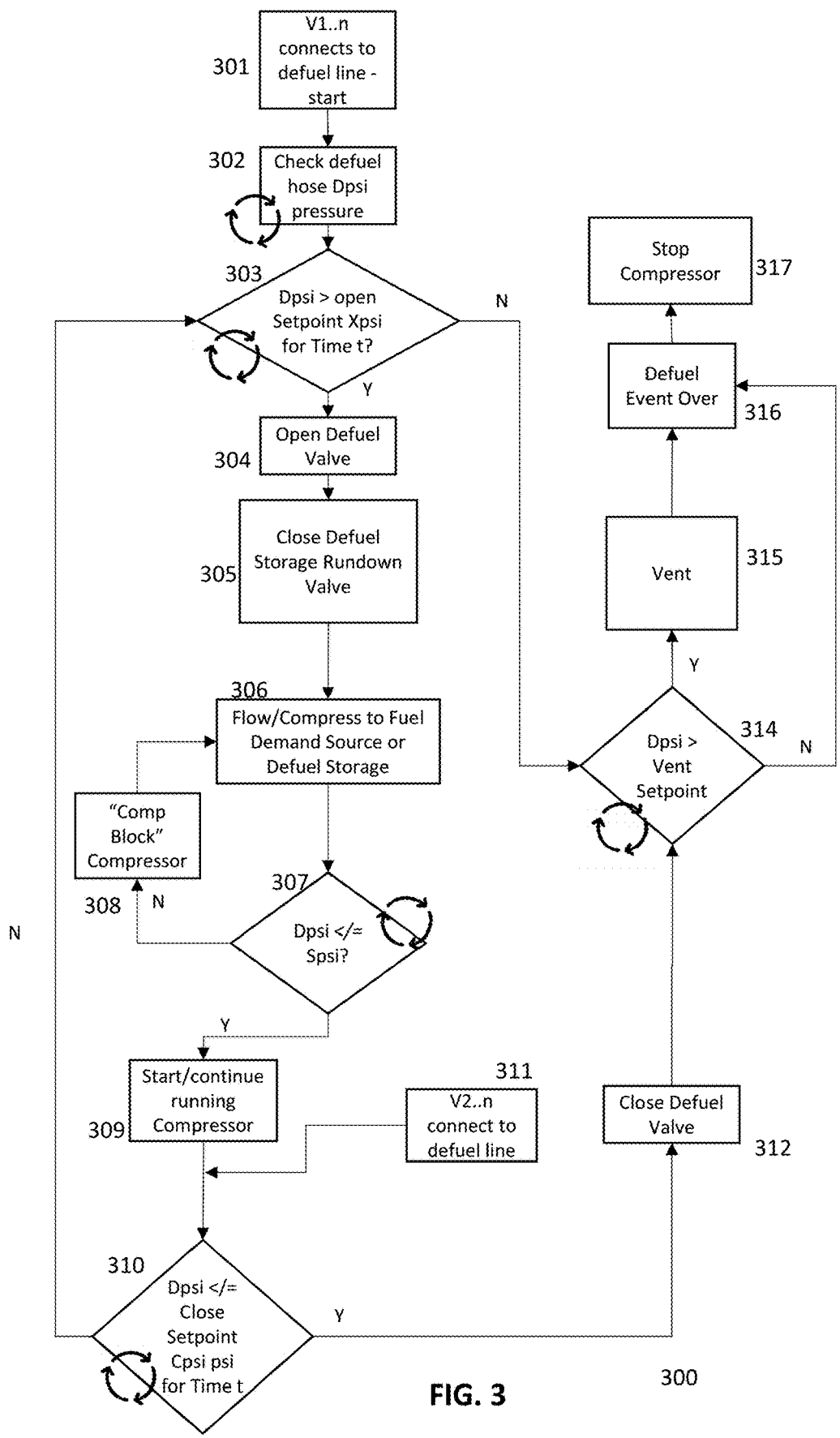
FIG. 3 is a block diagram showing a process for defueling a compressed natural gas vehicle.

As described in more detail with respect to FIG. 3, during this time, the controller commands the compressor 15 to run. If the compressor 15 is already running, filling time fill or direct fill, the defueled gas is directed toward the demand already in place. If there is no demand on the system, the compressor 15 is commanded to run and the defuel vehicle gas is compressed into the onboard defuel storage tank(s) 201, shown at FIGS. 2A-2E. The compressors 15 will continue to run until the defuel vehicle is down to a User Set Point, for example 250 psi-300 psi. The controller can be configured to automatically shut down the compressor 15 if it is no longer otherwise needed.

In an embodiment, the Defuel/Priority panel system 100 is configured to depressurize fuel stored by the system in the defuel storage tanks 201, referred to as a storage run down. As described in more detail with respect to FIG. 5, any time there is a demand for fuel, the controller can be configured to determine if there is fuel available in the defuel storage tank 201 first. As an example, if time fill is active, and the defuel storage tank 201 has fuel or is full of fuel, the system 100 can be configured to use fuel from the defuel storage tank 201 first. Thus, the system can be configured so that the storage vessels 201 are empty for the next vehicle to be defueled. To do this, each time there is demand on the system 100 and the defuel storage tank 201 is full or has fuel, a run down valve 143 opens. This allows gas from defuel storage tank 201 to flow through the defuel regulators 128 once again. This takes the high pressure CNG from the defuel storage tanks and regulates it down to 250-300 psi to be reused into the compressor inlet 204. As shown in FIG. 1B and described with respect to FIG. 5, a defuel valve 145 is closed and the gas returns along the same path in the opposite direction on the defuel line 203 that a defueled vehicle gas takes during a defuel event to run down (i.e. defuel) the defuel storage tank(s) 201 for use by the fuel demand source.

In an embodiment, the system 100 can be configured as an "all in one" system with on board storage or external remote mounted storage. The system 100 is configured to combat the freezing effect of defueling gas and that is used to defuel vehicle gas via a priority system to a direct flow per demand.

The operation of certain embodiments will now be described with respect to FIGS. 3-5. In at least one of various embodiments, processes 300, 400 and 500 described in conjunction with FIGS. 3-5, respectively, can be implemented by and/or executed on a computer comprising a controller configured to operate the Defuel/Priority panel system 100. Exemplary wiring and interface for a control station module 11 is shown and described in U.S. patent application Ser. No. 16/884,996 entitled MODULAR AND PORTABLE COMPRESSED NATURAL GAS FUELING STATION, filed on May 27, 2020, the entirety of which is incorporated by reference herein.

In an embodiment, the system can be fully automated. In an embodiment, the system 100 can be configured to allow a user to perform some operations manually, to override automated processes, or to select a fully automated operation.

FIG. 3 shows a flow for a system controller and defueling process. At block 301, the system starts when an operator connects vehicle, trailer, truck, tank or vessel having one or more tanks or vessels of CNG (hereafter collectively referred to as a "vehicle" "vessel" or "tank") to a defuel line 203 via a defuel hose nozzle or defuel inlet 202 to defuel the vehicle and a defuel switch is turned on. At block 302 control logic is configured to check defuel hose pressure Dpsi of a vehicle measured by a vehicle defuel line pressure transducer 121. At block 303, the system determines if a defuel hose valve open pressure setpoint Xpsi is met. For example, in an embodiment, the system is configured to determine if defuel hose pressure is greater than open setpoint Xpsi (ex. X=450 psi) for setpoint time t (ex. t=60 seconds). If so, at block 304 the controller opens the defuel valve 145, which allows vehicle gas to free flow into the panel system 100.

At block 305, the controller commands the defuel storage run down valve 143 to close to prevent fuel in the defuel storage tank 201 from flowing into defuel system 100. In an embodiment, the system can be configured to keep the run down valve 143 shut as a default, whereby control logic does not need an express command to open and shut the rundown valve unless carrying out a rundown operation (such as that described with respect to FIG. 5). At block 306, the gas continues to free flow to either a fuel demand source (time fill, direct fill, and so on) or, if there is no demand on the system, to the defuel storage tank 201 as described herein.

At block 307, the system 100 command logic is configured to check defuel hose pressure Dpsi against the defuel storage pressure Spsi for time t. A defuel storage pressure transducer 119 measures the defuel storage pressure. At block 308, if defuel hose pressure is equal to or greater than the defuel storage pressure, the system is configured to prevent the compressor(s) 15 from starting so as to continue the free flow of the tank gas into defuel storage tank 201, and/or any other demand source gas location the panel is plumbed to (time fill, direct fill, etc.) at block 306. The system includes a timer for preventing compressors 15 from starting for a setpoint t amount of time when a tank is initially connected to the defuel system. This timer runs while the system compares defuel hose pressure Dpsi to defuel storage pressure Spsi. The timer can be set to a time sufficient to allow gas to free flow, for example 30-90 seconds (e.g.: 60 seconds). One exemplary advantage of allowing free flow and preventing compressors 15 from running during pressure equalization is curbing heavy electricity usage from compressor 15 operation and reduces defuel operating time.

The compressors 15 are thus prevented from running while free flowing gas from the tank into defuel storage tanks 201 or other fuel demand locations (e.g. time fill, direct fill). The system is also configured so that defuel hose pressure Dpsi is equalized with defuel storage pressure Spsi to allow as much gas as possible to freely flow into defuel storage before starting compressors. In an embodiment, the logic for the defuel hose pressure Dpsi that starts the compressor 15 is set to an artificially smaller value than the actual defuel hose pressure Dpsi on the defuel line by subtracting a setpoint amount of pressure (e.g. −100 psi) so that actual defuel line 203 pressure Dpsi still drops and eventually goes below defuel storage pressure Spsi to trigger the logic to start the compressors 15. This allows the system to defuel the tank within 100 psi of the defuel storage pressure Spsi without running compressors 15, then uses compressors 15 to pull the rest of the gas out of the vehicle. This prevents a stagnant state where defuel hose pressure Dpsi can be a few psi higher than defuel storage pressure Dpsi, but gas no longer flows. The stagnant state would cause the system to not defuel because the compressors 15 do not start until defuel hose pressure Dpsi drops below defuel storage pressure Spsi.

When the defuel hose pressure equalizes (less than or equal to) with defuel storage (Dpsi</=Spsi for time t), at block 309, the system is configured to start the compressor (s) to pull remaining gas out of tank. The controller can also be configured to turn on the heat exchange system 167 to prevent freezing. In an embodiment, logic for operating the heat exchange system can be set to the defueling pressure logic.

At block 310, the system is configured to check if a defuel hose pressure Dpsi meets a close setpoint Cps for time t. For example, once the compressors 15 are running and defuel hose pressure is still greater than open setpoint Xpsi (ex. X=450 psi), the system is configured to determine if the defuel hose pressure close setpoint Cpsi (e.g. C=350 psi) is met. If not, the defuel storage rundown valve 143 remains closed the defuel valve 145 remains open. At block 306, this forces all gas on the defuel line 203 to either go through the heated exchange system 167 into the compressor inlet 204 or to free flow to available valves in the panel (time fill valve 141, direct fill valve 140, buffer valve 146, defuel storage valve 142). Once the gas is in the compressor inlet 204 header, it is now available to be compressed by the compressors 15 and sent to a fuel demand source (time fill, direct fill) or defuel storage, buffer storage, or any other location plumbed in the panel as described herein. As will be appreciated, as gas is substantially equalized to all locations, the gas can now be compressed to these locations without having to vent defueled gas.

At block 311, one or more other vehicles Vn can connect to the defuel line. If compressors 15 are already running when a vehicle connects to the defuel system, at block 302 defuel hose pressure Dpsi is compared to the defuel valve open setpoint Xpsi. Again, if the defuel hose pressure Dpsi goes above the open pressure setpoint Xpsi, the system opens or keeps open the defuel valve 145 and, when open, closes the defuel storage rundown valve 143 as shown in block 304 and block 306 respectively. Accordingly, vehicle gas can free flow into time fill valve 141, direct fill valve 140, buffer valve 146 as shown at block 306 as described herein. Because the rundown valve 143 is closed, all suction from the compressor 15 pulls gas from the vehicle being defueled. Gas then flows through any valves in the panel that are open for fueling.

As described above, the tank is defueled until defuel hose pressure Dpsi is less than or equal to defuel close setpoint Cpsi at block 310. For example, the controller can open defuel storage valve 142 to pull in all non-demand compressor discharge and fill defuel storage up to 4500 psi. The controller can be configured to perform temperature compensation to adjust the close setpoint Cpsi. For example, a temperature compensation algorithm is configured to measure ambient temperature and adjust the defuel close setpoint Cpsi to compensate for the rise in pressure that occurs to compressed gas first stored at cooler temperatures when the ambient temperature rises. Defuel storage is thus filled to a temperature compensation adjusted psi.

Accordingly, the system 100 is configured to close the defuel valve 145 when the defuel hose pressure Dpsi is less than or equal to defuel close setpoint Cpsi for time t at block 310. If so, at block 312 the system closes the defuel valve 145. As will be appreciated the system is configured to continually check if the defuel valve 145 open pressure setpoint Xpsi of block 303 and the close defuel valve 145 setpoint Cpsi of block 310 is met. As shown in FIG. 3, once the defuel valve 145 is closed, the system continues its monitoring of the defuel line pressure at block 302. At block 303, if the defuel line pressure Dpsi goes above the open pressure setpoint Xpsi the system again opens the defuel valve 145 and, when open, closes or keeps closed the defuel storage rundown valve 143 as shown in block 304 and block 305 respectively. Again, as noted above, in an embodiment the rundown valve 143 can be kept closed by default and is only opened or closed during run down event (see FIG. 5). The process continues as shown in FIG. 3 and can thus cyclically open and close the defuel valve 145 based on the pressure on the defuel line 302 as it fluctuates.

As will be appreciated, during defueling, the system is configured to manage fuel demand or defuel storage available on the system by monitoring the defuel hose pressure Dpsi in conjunction with the open Xpsi and closing Cpsi set points. The defuel process also uses intelligent timers. As shown above, the system is configured to compare defuel hose pressure Dpsi, which corresponds to the vehicle pressure, to open Xpsi and close Cpsi setpoints. When defueling a vehicle, however, there is always a difference in pressure between what is actually in the vehicle and what pressure the system transducer reads at the defuel hose pressure Dpsi due to restrictions on the tank or vessel being defueled. When defuel hose pressure is less than or equal to the defuel hose valve close setpoint Cpsi, the logic closes the defuel valve 145. When the defuel valve 145 closes, pressure immediately climbs back up, for example due to restrictions on the vehicle or the forces of pressure flow systems. The system 100 is thus configured to start a timer as it checks defuel hose pressure Dpsi while defuel valve 145 is closed for a setpoint amount of time t against the defuel hose valve open setpoint Xpsi. If defuel hose pressure Dpsi climbs to a pressure greater than open setpoint Xpsi, at block 303 the system re-opens defuel valve 145 and continues to defuel the vehicle until pressure drops below close setpoint Cpsi again. This process can happen several times, whereupon the defuel hose pressure Dpsi will eventually stay below the open setpoint Xpsi. The timers prevent running compressors 15 from turning off while defueling, such as when the defuel valve 145 is opening and closing as the vehicle pressure gets close to the defuel hose valve close setpoint Cpsi. The timers thus keep the valves from prematurely closing and stopping the compressors 15, which would leave the tank with excess gas.

When the defuel hose pressure stays below the open setpoint Xpsi beyond time t, then the defuel valve 145 will remain closed and the defuel event has completed at block 316. If compressors 15 are started for the defuel event at block 309, then at block 317 the controls can be configured to stop running the compressors 15 and return station to previous state.

The controls can also be configured to allow the compressors 15 to keep running even after a defuel event is over, for example, if the compressors 15 run on a regular schedule at a station. In an embodiment, CNG controls have schedules available where they prevent compressors 15 from running, or prevent certain valves from being opened during certain times. For example, the system can be configured with a time fill schedule where a time fill valve would remain closed between 12 pm and 6 pm, where no gas is pumped to vehicles on time fill during this time. The defuel system 100 can utilizes schedule bypasses. With a schedule bypass, a vehicle being defueled can have its gas pumped into other vehicles if there is gas demand, rather than into defuel storage. This keeps defuel storage empty in case during a defuel event.

In an embodiment, the system has a check valve on the utility line to the compressor(s) inlet. (not shown). When the pressure on the compressor(s) inlet is higher than the pressure on the line from the utility, the check valve is forced shut. The defuel system outlet pressure is set higher than the utility inlet line, this forces gas to the compressor inlet 204 without taking gas from the utility. For example, when a utility regulator (not shown) is set at 20 psi, the defuel line to compressor inlet can be set to 10 psi above the utility pressure (e.g. 30 psi) thus the check valve is shut and defuel gas is routed to the compressor. Accordingly, defuel pressure is always set above the inlet psi Ipsi. For example, the check valve is closed whenever defuel inlet psi is at least 10 psi over the inlet psi (Ipsi+10 psi). As will be appreciated, setting inlet pressure and the defuel inlet pressure is site specific. For example, a site's defuel inlet can be from about 10 psi to about 50 psi higher than the utility supply pressure. In another embodiment, a gas pipeline compressor inlet 204 can be even higher, for example 800-950 psi, requiring defuel inlet of at least 50 psi higher or more (e.g. 1000 psi). As will be appreciated, if a utility requires a very high inlet pressure, then the defuel open setpoint Xpsi to open the defuel valve also can also be set higher to keep utility gas from the utility from going to the compressor inlet 204 during a defuel event.

Accordingly, the compressor inlet 204 has lower psi (Ipsi) (e.g. 50 psi) than the defuel hose pressure Dpsi. This allows the compressor 15 to keep pulling gas down until the inlet reaches 250-300 psi (required for service), which pulls 95% of the gas from the vehicle, which started at 4200 psi. As noted herein, utility inlet pressure values are site specific. Defuel hose pressure can always be drawn down to at least but not limited to 50 psi higher than utility inlet while utilizing compressor(s). As also noted, the remaining fuel can be vented via the auto vent valve to a user set pressure or zero pressure.

At block 314, if there is no further fuel demand (time fill, direct fill) or defuel storage on the system 100, the system is configured to vent the depressurized gas. For example, in an embodiment, the system can be configured with an automated Vent Mode, which allows for manual or automatic venting of gas to atmosphere. An automated Vent Mode is configured to carry out the defuel operations as shown in FIG. 3, but if there is not anywhere for gas to defuel to, then the system will allow gas to flow through a defuel vent valve 147. In an embodiment, the defuel vent valve 147 includes a regulated needle valve to restrict gas flow to a safe flow rate. The gas going through the vent valve 147 can be directed a vent to atmosphere system vent 47, which vents the gas to atmosphere in a safe location away from any personnel. The vent mode can also be configured for manual operation to manually vent to atmosphere (e.g.: if compressors 15 are unable to run).

In an embodiment, the system can be configured to allow a complete defuel of the vessel down to zero pressure through the defuel vent valve for tank inspections and other maintenance purposes. The system can include, for example, a tank drain button on a vent mode screen at the controller, which then triggers logic to open defuel vent valve. As explained above, the defuel vent system includes a regulated needle valve that creates a pathway for vehicle gas to go to a vent to atmosphere system vent 47.

Figure 4:
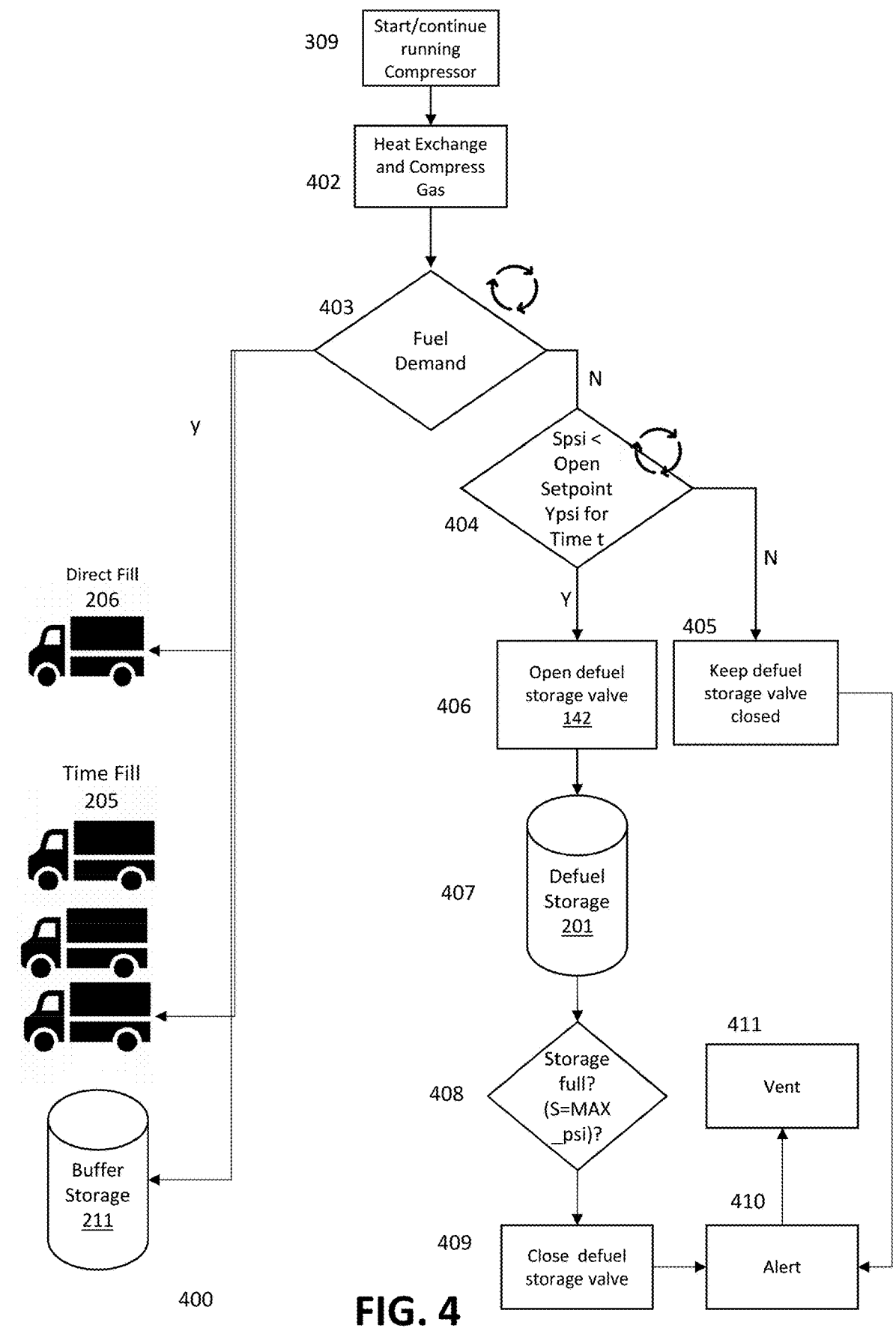
FIG. 4 is a block diagram showing a process for directing fuel to fuel demand locations.
Figure 5:
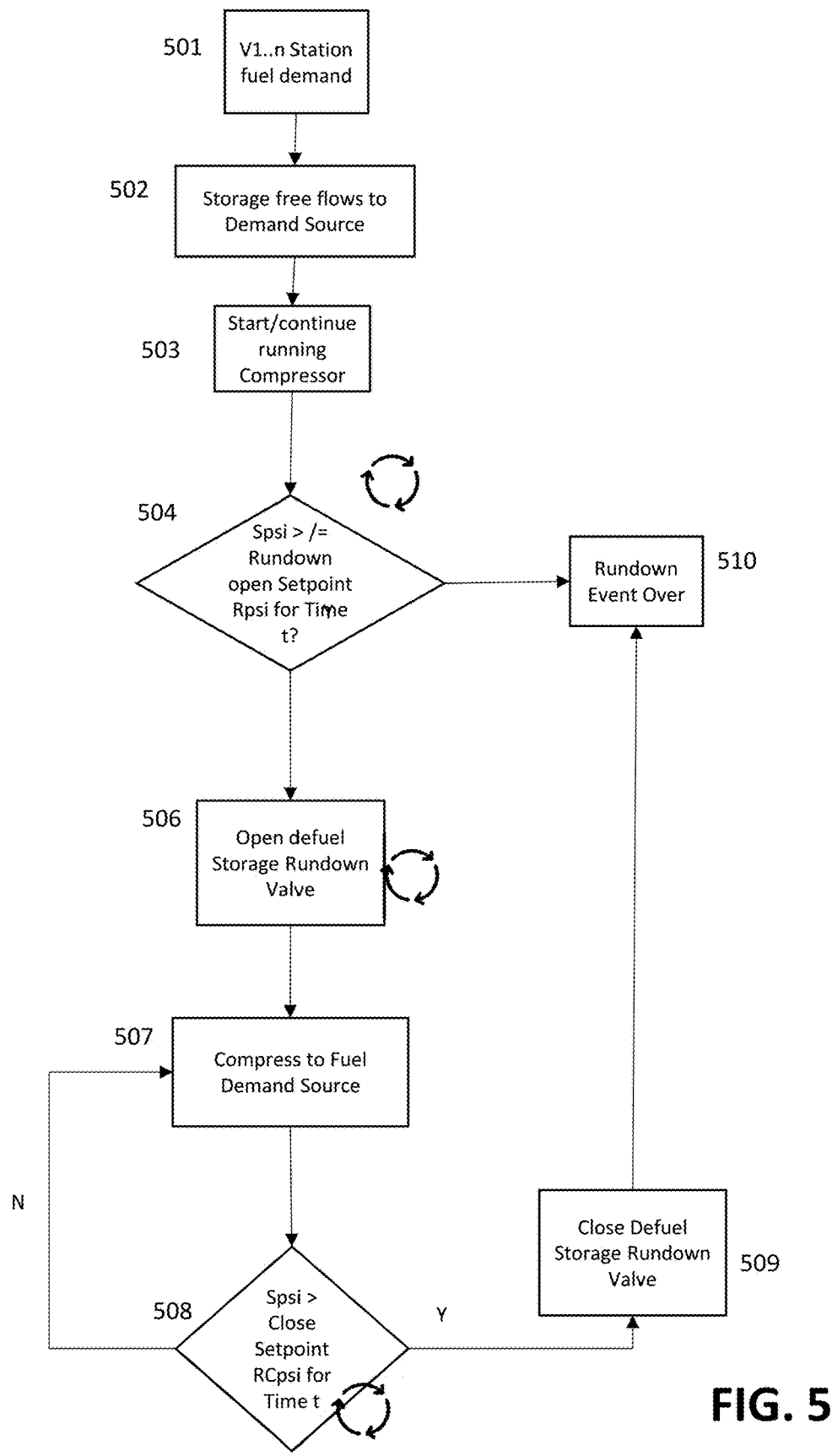
FIG. 5 is a block diagram showing a process for a rundown of a defuel storage tank to fuel demand locations.

FIG. 4 shows a flow for a system controller and defueling storage process. Defuel gas from a vehicle can have the following pathways from a defuel line 203:

Free flow or compressed into defuel storage tank(s) 201 via the defuel line 203. A defuel storage isolation valve 152 is closed when defuel storage is offline or during service.

Free flow or compressed out time fill valve 141 into vehicles via a time fill line 205.

Free flow or compressed out direct fill valve 140 via a direct fill line 206 into a vehicle.

Compressed through buffer storage valve 146 into buffer storage tank(s) 211 via a buffer storage line 207. A buffer storage isolation valve 151 is closed when buffer storage is not in use.

As shown herein, prior to starting the compressor, defuel gas free flows to fuel demand until gas pressure equalizes. For example, a defueling vehicle can free flow from 4500 psi into the system 100 until the fuel demand or storage locations and vehicle equalize (e.g. to 2000 psi.) As shown in FIG. 4, once the compressor(s) have started (FIG. 3, block 309) at block 402, defuel gas is routed through the heat exchange system 167 and decompressed to the compressor inlet 204 to be compressed by the compressor 15.

At block 403 the system 100 controller is configured to determine if there any fuel demand for a time fill, direct fill, or buffer storage demand 211 on the system 100. At block 403, if fuel demand exists, gas is then delivered to compressor(s) inlet 204 and compressed to discharge inlet 209 and compressed gas line to a fuel demand source, if any, either along a time fill line 205 to time fill or to a direct fill line 206, or buffer storage line 211.

If no fuel demand exists in system 100 at block 403, then the controller will determine if the defuel storage system 201 Spsi is less than an open defuel storage fill valve 142 Ypsi setpoint for time t at block 404. If so, the defuel storage valve 142 is commanded open at block 406 and gas is compressed into defuel storage 201 at block 407. At any point while compressing gas into defuel storage, if a fuel demand is created, then defuel storage valve will be closed until fuel demand is satisfied. At block 408, if Spsi is greater than or equal to defuel storage close setpoint, then defuel storage valve 142 will be commanded closed at block 409. If fuel demand locations are full and defuel storage is full, then vent system can be utilized.

In an embodiment, the controller performs temperature compensation to determine and adjust a closing or stop setpoint based on the fill capacity. For example, a temperature compensation algorithm is configured to measure ambient temperature and adjust a storage full setpoint to compensate for the rise in pressure that occurs to compressed gas stored at cooler temperatures when the ambient temperature rises. For example, as known in the art, the ambient temperatures for vehicles on time fill or direct fill are monitored during a fill, and at lower temperatures, vehicles will be treated as full when the pressure is at (for example) 3600 psi at 70 degrees Fahrenheit. Accordingly, a temperature compensation can also be configured adjust the defuel storage valve 142 open setpoint Ypsi to a lower pressure, in which case the defuel storage valve will be opened when defuel storage Spsi is less than open setpoint for time t.

In an embodiment, the system can include logic to alert a user that there is no further defuel storage 201 available. For example, as explained above, if there is no demand on the system 100 or the demand sources are full at block 403 and if the defuel storage 201 is filled to a maximum capacity S=MAXpsi (e.g. 4200-4500 psi), at block 410 the controller is configured to send an alert indicating storage is full. For example, in an embodiment, the system can be configured to activate a light on a control panel 180 that alerts a user that there is no further location to defuel gas to.

At block 411, the system can be configured to vent the remaining gas from the vehicle. In an embodiment, the system can be configured to switch from automated defueling to an automated/manual operation to vent the gas, for example at control panel 180. In another embodiment, the system can be configured to automatically vent gas if the defuel storage 201 is filled to maximum capacity and there are no other demand locations for the system 100 to defuel to. In another embodiment, the system 100 can be configured with an alert or manual operation, relying instead on operator observation of pressures when the system 100 stops.

As will be appreciated, fuel sources for time fill and direct fill will always equalize while time fill valve or direct fill valve is open. Further, the end of a time fill event is determined by measuring time fill pressure on a time fill line 205 with a time fill transducer 118 and gauge 102 compared to stop/close setpoints (e.g. to 4200 psi). Similarly, the end of a direct fill event is determined by measuring direct fill pressure on a direct fill line 206 with a demand fill transducer 117 and gauge 101 compared to stop/close setpoints (e.g. to 4200 psi).

The defuel system will continue to pull gas from the vehicle tank through the heat exchange system 167 into the compressor inlet 204 header. The compressors 15 then compress the gas from compressor inlet 204 header through the defuel storage fill valve 142 into the defuel storage tank 201 until the defuel event is complete, or until all locations for the gas are full. Any gas in defuel storage 204 can then be used the next time there is a fuel demand on the system as described herein.

In an embodiment, the system is configured to rundown defuel storage process. FIG. 5 shows a flow for a system 100 controller and defuel rundown process. At block 501, a fuel demand for direct fill or time fill connects to the system for fuel. The system is configured to open the defuel rundown valve 143 to allow gas to flow from the defuel storage tanks 201 to either the time fill line 205 or the direct fill line 206. Accordingly, when the fuel demand connects to the system 100, any fuel in demand storage free flows in the opposite direction on the defuel line 203 from the defuel storage tank 201 to the open direct fill valve 140 to the direct fill line 206, or to the open time fill valve 141 to the time fill line 205. The system can also free flow the stored fuel to a buffer storage valve 146 and buffer storage line 207. At block 503, if the compressors 15 are not already running, when the system pressure equalizes, the system is configured to start the compressors 15 and activate the heat exchange system 167 to compress fuel to the demand source.

The system is configured to determine if the defuel storage tank 201 has stored defueled gas. At block 504, the system checks the defuel storage pressure using the defuel storage pressure transducer 111 and defuel storage pressure gauge 103 to determine if the defuel storage Spsi is equal or greater than a defuel rundown open setpoint Rpsi for time t, for example 300 psi. If not, the defuel storage tank is deemed empty and at block 511, the defuel rundown is over. At block 506 if Spsi is greater than or equal to open setpoint Rpsi for time t, the controller opens the defuel storage rundown valve 136 and allows defuel storage gas to the flow into compressor inlet 204 to be compressed to a fuel demand source. In an embodiment, the system 100 can be configured to keep the defuel storage rundown valve 136 closed by default, such that the controller logic only opens the defuel storage rundown valve 136 when the defuel rundown open setpoint condition is met and there is a fuel demand source to deliver gas to.

In an embodiment, the system 100 can be configured to set the defuel rundown open setpoint Rpsi so that the system 100 defaults to running down or defueling the defuel storage tanks before using utility gas supply. As described herein, defueled gas is compressed to defuel storage tanks 201 up to a high pressure (e.g. up to 4500 psi), which advantageously maximizes defuel gas storage and minimizes vented defuel gas. Accordingly, only low pressure defuel gas, for example 300 psi and lower, is vented when vehicles and/or storage are emptied. As such, setting the defuel rundown open setpoint Rpsi at this low-pressure threshold assures that the defuel storage valve 135 will remain open as the default fuel source.

At block 507 the defuel storage rundown valve 143 remains open and the defuel valve 145 remains closed. This forces all gas on a rundown line 212 to either go through the heated exchange system 128 into the compressor inlet 204 or to free flow to available valves in the panel (time fill valve 141, direct fill valve 140, buffer valve 159). Once the gas is in the compressor inlet 204 header, at block 507 it is now available to be compressed by the compressors 15 and compressed and sent to a fuel demand source (time fill, direct fill) or to buffer storage, or any other location plumbed in the panel as described herein. The compressed gas is delivered to a compressor discharge inlet 209 and compressed gas line 210 to a fuel demand source, if any, either along a time fill line 205 to time fill a fleet of vehicles or to a direct fill line 206 to a vehicle getting a direct fill. The compressed gas can also be compressed to buffer storage tanks 211.

At block 508 the system is configured to determine if a defuel rundown pressure close setpoint RCpsi is met. At block 508, if the defuel rundown pressure close setpoint RCpsi (e.g. C=300 psi) is met, the rundown storage valve is closed. This leaves the defuel storage tank empty for the next defueling event. At block 510, the defuel rundown is over.

In an embodiment, as shown in FIGS. 6A-6E, the system includes a control panel 180 for the priority defuel system 100. The control panel 180 includes a computer interface 213 operatively connected to a processor and program memory including instructions to execute the program logic described herein. The embodiments disclosed herein can be practiced using programmable digital computers. A computer device includes at least one processor or microprocessor central processing unit (CPU). In an embodiment, the system is configured to employ one or more Programmable Logic Controllers (PLC) configured with multiple input and output arrangements hardwired to the priority defuel system 100. For example, in an embodiment, the control panel 180 can include Horner™ PLC's and Smart Block I/O devices configured with analog and digital inputs and outputs.

The PLC can be configured to operate with a power supply, for example a 480 v/120 v/24 v control panel, to power the priority defuel system 100.

A data storage device memory can store a control program. The control panel can also be configured with co-processor modules that are programmable general-purpose microcomputers that expand the capability and functionality of the PLC system. In an embodiment, the control program for the PLC is written in a ladder logic programming configured to carry out the processes described herein.

The system can also be configured to interface with a peripheral computer device to input data and monitor the equipment operation, for example, a personal computer, handheld programmer, or an operator touch screen. The computer can further include input devices such as, e.g., a mechanical switches, a touchscreen, a keyboard or mouse, an output device such as, e.g., an LCD or LED display 213, a communications interface, a data storage device and memory such as Random-Access Memory (RAM), Read Only Memory (ROM), Programmable ROM, Electrically Erasable PROM, or Ultraviolet-erasable PROM. The computer can include a communications interface can be coupled to a network, for example, a LAN or a WAN via wired or wireless networking.

It will be appreciated that a computer system can also be implemented on platforms and operating systems other than those mentioned. Any operating system or other program, or any part of either, can be written using one or more programming languages such as, e.g., ladder logic, Java®, C, C++, C#, Visual Basic®, VB.NET®, Perl, Ruby, Python, or other programming languages In an embodiment, the control panel 180 can also include a control selector for selecting between vehicle or trailer defuel operation shown as a 2-position keyed selector switch 215. In another embodiment, the defuel priority panel includes a control selector configured to allow a user to switch to automated defuel operation, automated/manual vent operation, or to turn system off, shown as a 3-position keyed selector switch 216. For example, when automated defueling is selected, the system is configured to employ automated logic to carry out the processes as described herein with respect to FIGS. 3-4. When the automated/manual vent is selected, in manual operation, the system can be configured to allow a user to manually select defuel, time fill, direct fill, defuel storage and venting as options as opposed to relying on automated logic as described herein. For example, manual operation can allow a user to turn off defuel storage and venting when defueling vehicles, for example, to demonstrate or maximize defueling efficiency and full use of defueled vehicles into demand sources. In an embodiment, the system can be configured to switch from automatic defueling to a manual operation to vent the gas as described herein. In another embodiment, the system can be configured to automatically vent gas if the defuel storage is filled to maximum capacity and there are no other demand locations for the system 100 to defuel to.

The defuel priority control panel 180 can also include a number of indicators and control inputs for system operation. For example, the control panel can comprise a fault reset button 217, a defuel ready (green light) 218 indicator, a storage full (amber light) 219 indicator and a fault on (red light) 220 indicator. As described herein, a panel indicator can be configured to send a fault alert if, for example, there is no location to vent gas to.

The defuel priority control panel 180 can also include the control interface 213 to allow the user to monitor gas flow and fueling and defueling operations as described herein. For example, the system can be configured so that the interface 213 displays or hides defuel screens and pressures, shows defuel or rundown statuses, or shows venting status. The control interface 213 can also be configured to allow a user to control or override automated processes, for example, venting, defueling or storing options. FIGS. 6B-6E show exemplary user interfaces 600, 620, 640, 680 for the control interface 213 in at least one of the various embodiments.

Figure 6A:
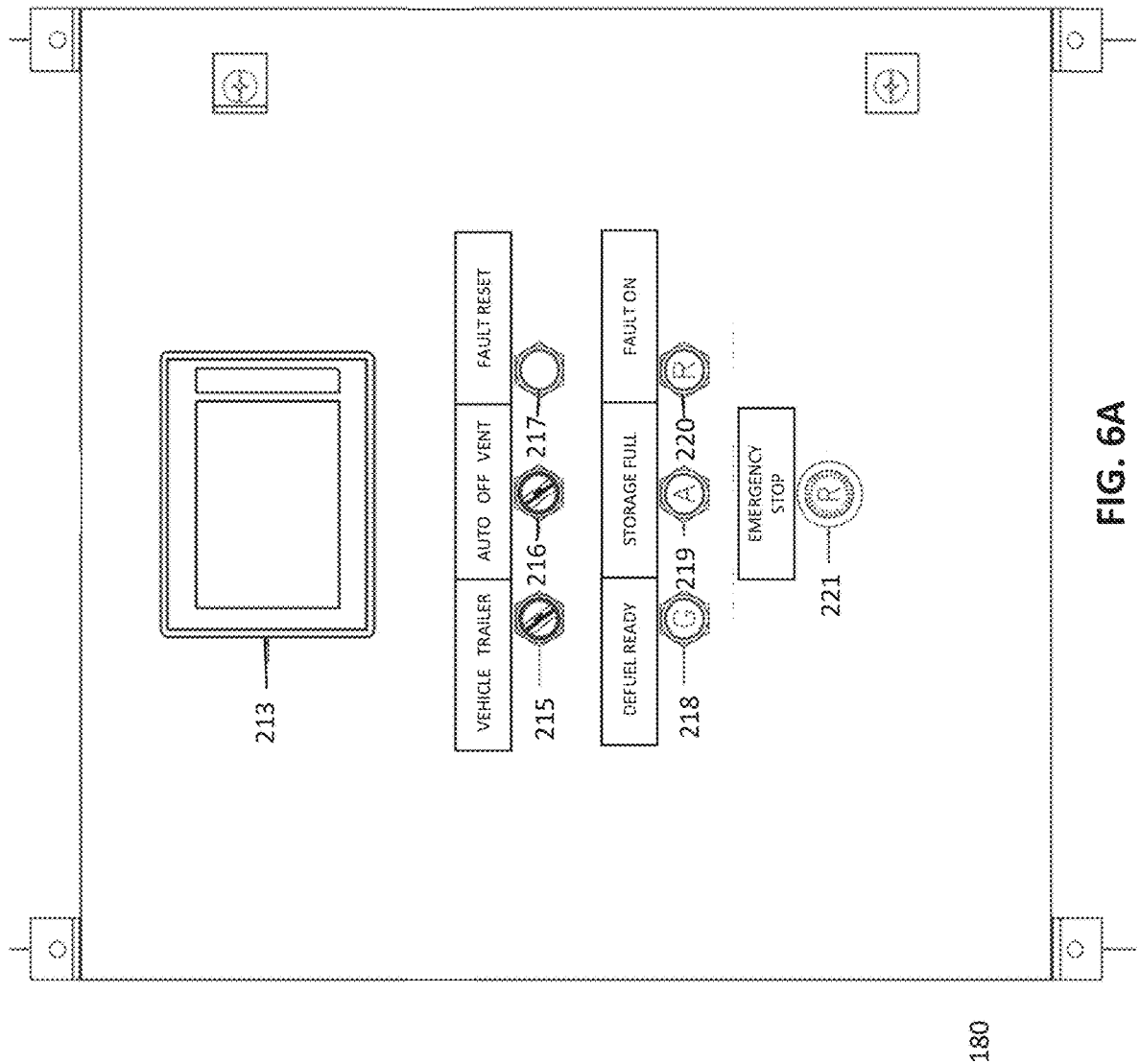
FIGS. 6A-6E illustrate a control panel for a priority and defuel system.
Figure 6B:
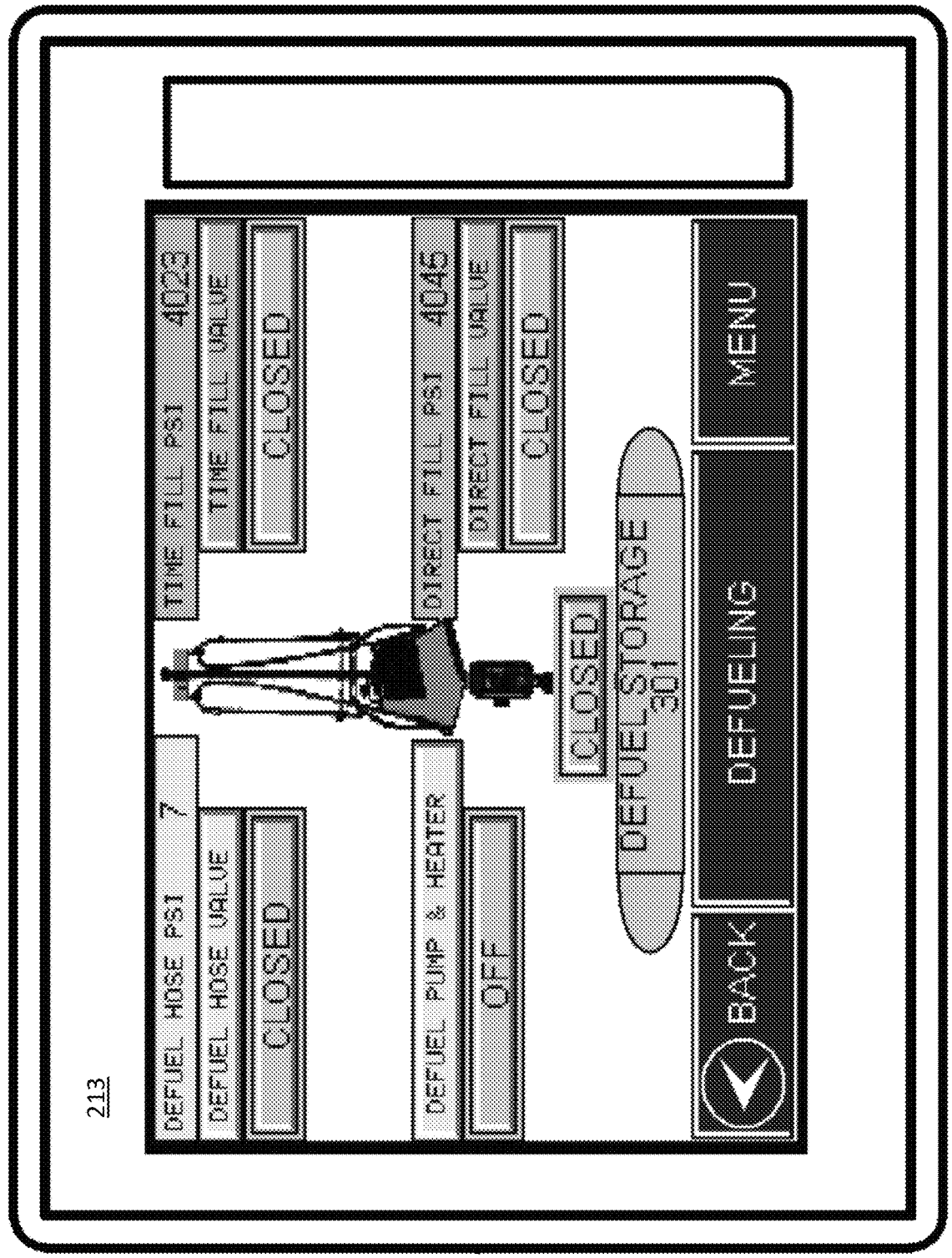

In an embodiment, FIG. 6B shows a defueling system status interface. The interface shows the pressures and valve positions (on/off) for each the defuel line, the time fill line, and the direct fill line. The interface also shows the pressure and opened or closed status of the defuel storage tank. The interface also shows whether the glycol pump and heater for the defuel system heat exchange system is on or off. The interface can be configured to allow manual control of the valves and the heater, subject to constraints of system operation (e.g. valves for full storage cannot be opened when no other demand is on system), or operation can be completely automated as described herein.

Figure 6C:
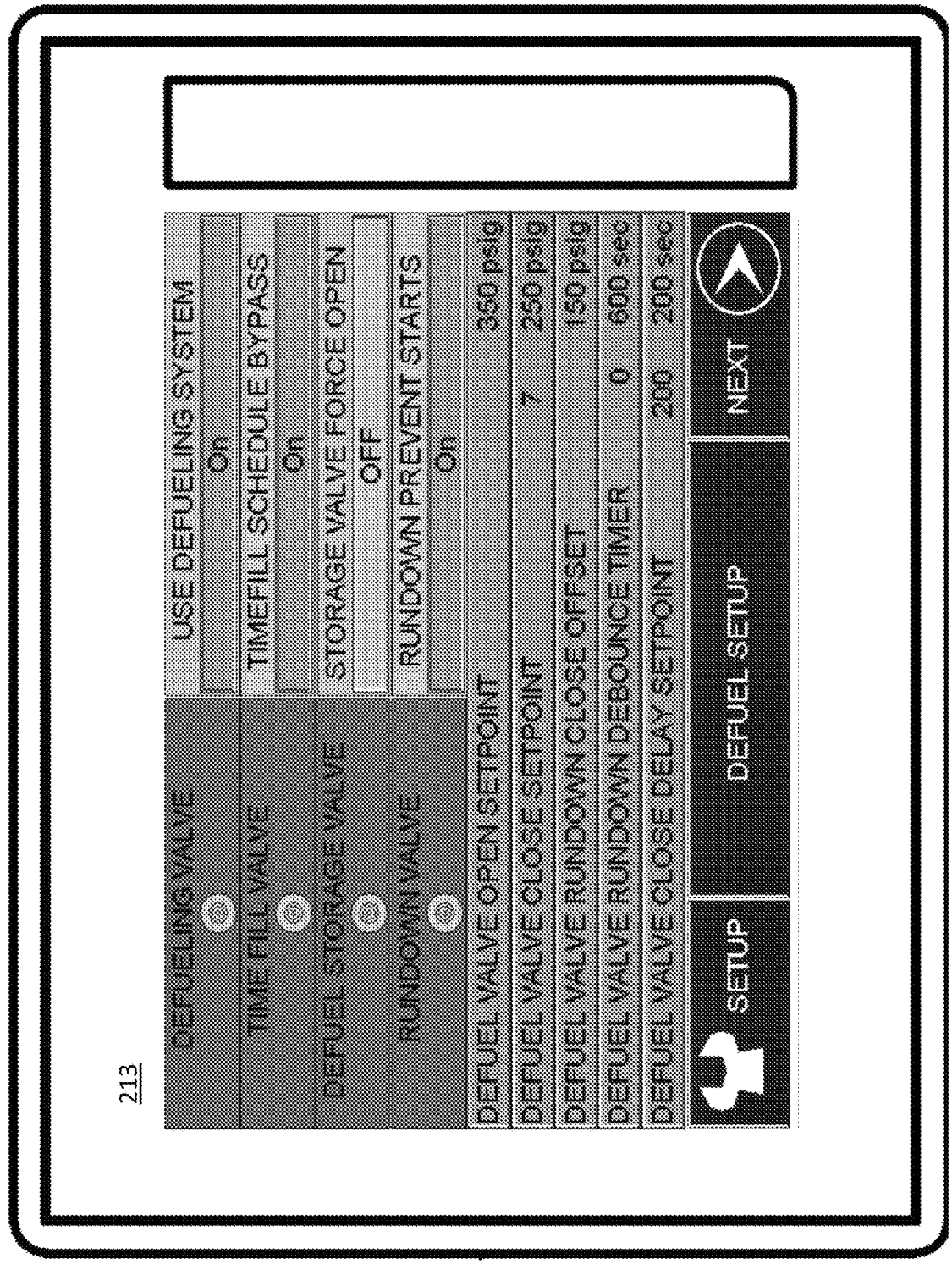
Figure 6D:
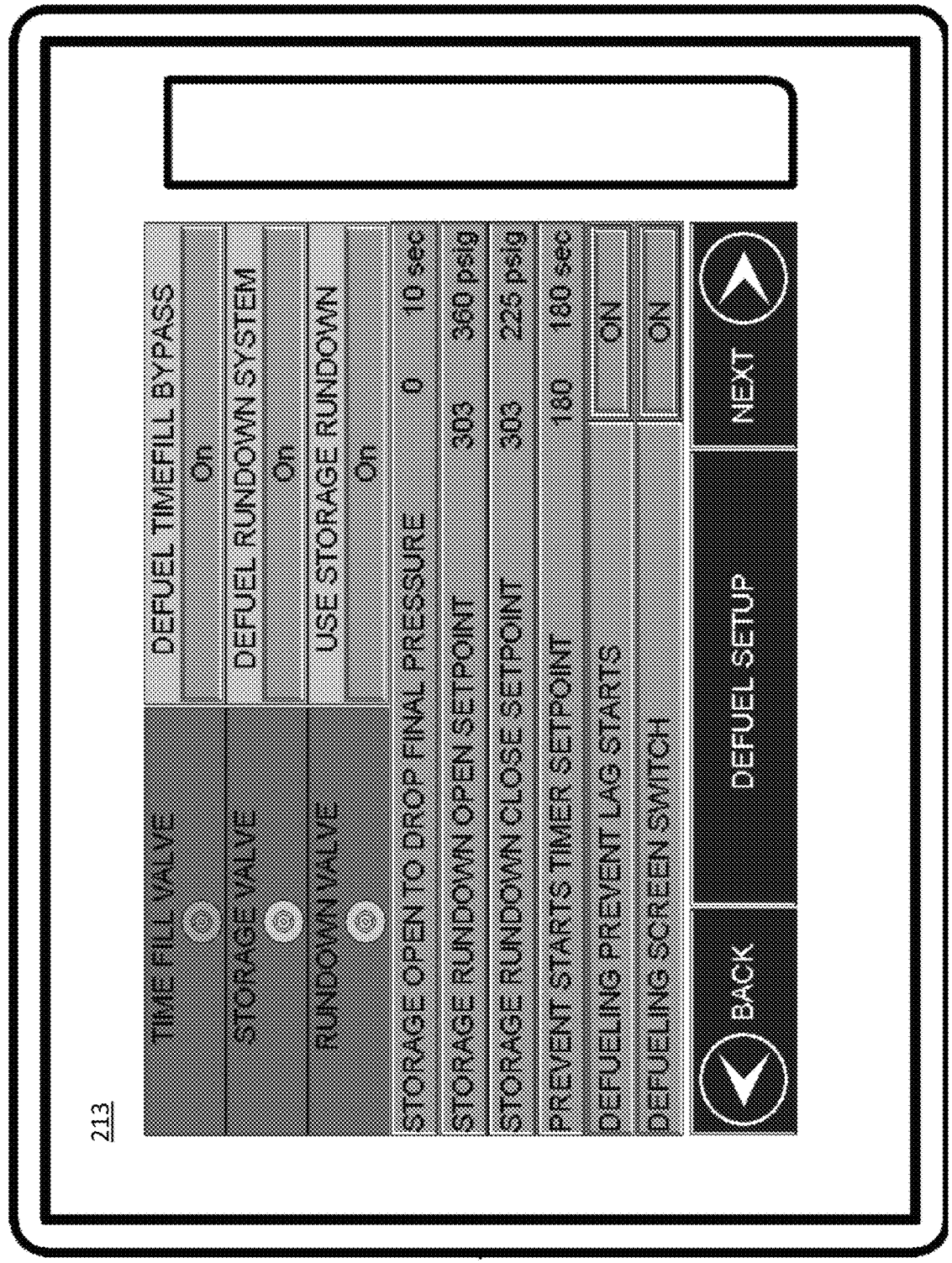

In the embodiment, FIGS. 6C-6D show a defuel setup interface to set the logic controls and system operation. For example, the interface has valve controls for each of the defueling valve, the time fill valve, the defuel storage valve, and the rundown valve:
the defueling valve is open when defueling system is in use (Use Defueling System: On);
a time fill schedule bypass is operative (Timefill Schedule Bypass: On);
the logic for forcing the defuel storage valve open is off (Storage Valve Force Open: Off); and
a rundown valve being open prevents defueling system from starting is on (Rundown Prevent Starts: On).

Figure 6E:
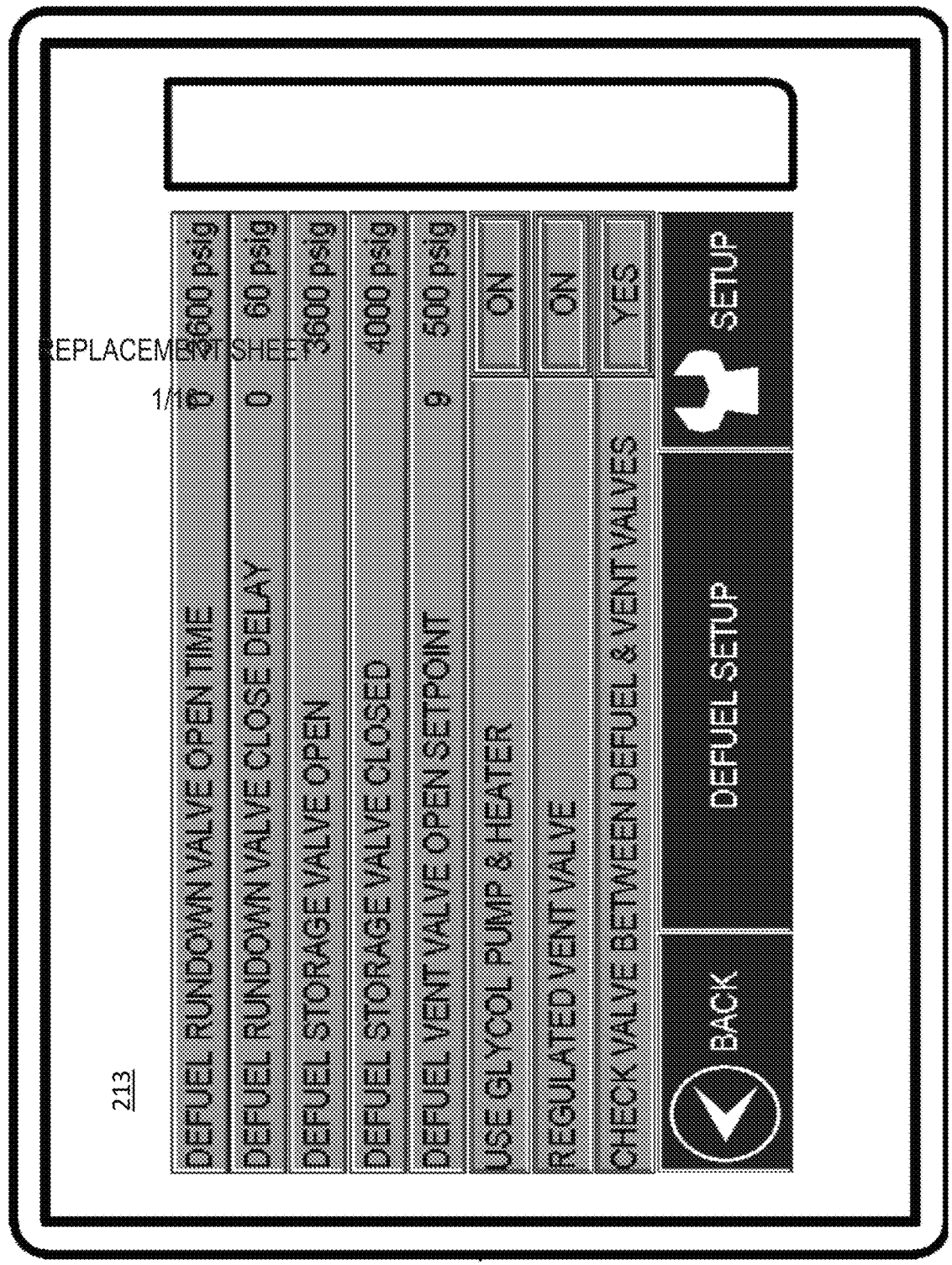

FIGS. 6C-6E also show configuration settings to set valve open and closing setpoints, offsets, and debounce timers. FIG. 6E also shows operation controls for operating the glycol pump and heater for the heat exchange system, the vent valve, and a check valve between the defuel valve and vent valve.

In at least one of the various embodiments, user interfaces other than user interfaces 610, 620, 640, 680 can be employed without departing from the spirit and/or scope of the claimed subject matter.

The following reference numbers are used on the Figures and description herein:
direct fill pressure gauge 101
time fill pressure gauge 102
defuel storage pressure gauge 103
buffer storage pressure gauge 104
truck defuel pressure gauge 105
defuel upstream pressure gauge 106
defuel manifold pressure gauge 107
control gas pressure gauge 108
direct fill purge valve 109
time fill purge valve 110
defuel storage purge valve 111
buffer storage purge valve 112
vehicle defuel purge valve 113
defuel upstream purge valve 114
defuel manifold purge valve 115
control gas purge valve 116
direct fill pressure transducer 117
time fill pressure transducer 118
defuel storage pressure transducer 119
buffer storage pressure transducer 120
defuel line pressure transducer 121
defuel upstream pressure transducer 122
defuel manifold pressure transducer 123
control gas pressure transducer 124
control gas pressure regulator #1 125
control gas pressure regulator #2 126
back pressure regulator 127
defueling pressure regulator (quantity of 4) 128
control gas safety relief valve 129
direct fill safety relief valve 130
time fill safety relief valve 131
defuel downstream safety relief valve 132
direct fill and buffer storage solenoid valve 133
time fill solenoid valve 134 defuel storage solenoid valve 135
run down solenoid valve 136
defuel solenoid valve 137
ESD solenoid valve 138
defuel vent solenoid valve 139
direct fill valve 140
time fill valve 141
defuel storage valve 142
run down valve 143
defuel valve 145
buffer storage valve 146
defuel vent valve 147
control gas isolation valve 148
control gas bypass valve 149
vent stack drain valve 150
buffer storage isolation valve 151
defuel storage isolation valve 152
defuel regulator isolation valve (qty of 4) 153
Gauge and valve panel 154
main inlet check valve 155
direct fill check valve 156
time fill check valve 157
buffer storage check valve 158
defuel storage check valve 159
defuel hose check valve 160
defuel manifold check valve 161
backpressure check valve 162
glycol pump 163
glycol heater 164
heat exchanger 165
storage tank and heat exchanger 166
a heat exchange system 167
manifold 168
fuel storage rack 170
mainframe 175
control panel 180
power panel 190
defuel storage tank 201
defuel inlet 202
defuel line 203
compressor inlet 204
time fill line 205
direct fill line 206
buffer storage line 207
glycol suction hose 208
compressor discharge inlet 209
compressed gas line 210
buffer storage tank 211
run down line 212
control interface and input/output device 213
2 position keyed selector switch 214
3 position keyed selector switch 216
fault reset button 217
defuel ready (green light) 218
storage full (amber light) 219
fault on (red light) 220
emergency stop (red button) 221

It will be understood that each block of the flowchart illustration, and combinations of blocks in the flowchart illustration, can be implemented by computer program instructions. These program instructions can be provided to a processor to produce a machine, such that the instructions, which execute on the processor, create means for implementing the actions specified in the flowchart block or blocks. The computer program instructions can be executed by a processor to cause a series of operational steps to be performed by the processor to produce a computer-implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments.

The invention claimed is:

1. A defueling system comprising:
   a compressor inlet;
   a defuel inlet for connecting to and defueling a pressurized fuel source having a pressure;
   a heat exchange system connected to the defuel inlet, wherein the heat exchange system is configured to prevent freezing during defueling and refueling;
   a pressure regulator;
   a defueling storage tank having a pressure Spsi for storing defueled fuel from the pressurized fuel source,
   wherein the pressure regulator is configured to depressurize a compressed gas being defueled from the pressurized fuel source, and
   wherein the defueling system comprises a refueling outlet configured to refuel a fuel demand source comprising a compressed natural gas (CNG) tank of a CNG vehicle with the defueled fuel from the defueling storage tank, and wherein the defueling system is configured to repressurize fuel being refueled to the fuel demand source from the defueling storage tank.

2. The defueling system of claim 1, wherein the heat exchange system comprises a plurality of heat exchangers.

3. The defueling system of claim 2, wherein the heat exchange system comprises from 2-3 of the plurality of heat exchangers.

4. The defueling system of claim 3, wherein the heat exchange system comprises 3 of the plurality of the heat exchangers.

5. The defueling system of claim 1, wherein the pressure regulator reduces the pressure from about 4500 psi to about 250 psi.

6. The defueling system of claim 1, wherein the defueling system uses a same line for refueling and defueling.

7. The defueling system of claim 1, wherein the defueling system is configured to pressurize fuel being refueled to the fuel demand source from a defueled vessel.

8. The defueling system of claim 1, wherein the defueling system is configured to prioritize refueling from the defueling storage tank before fueling from another fuel source.

9. The defueling system of claim 1, wherein the defueling system is configured to refuel demand sources including a direct fill demand source or a time fill demand source.

10. The defueling system of claim 1 wherein the heat exchange apparatus comprises:
    a manifold regulator comprising an antifreeze tank and an antifreeze heater;
    a pump; and
    the pressure regulator comprising a plurality of pressure changing valves.

11. The defueling system of claim 10 wherein the heat exchange system further comprises:
a first heat exchanger of the plurality of heat exchangers between the defuel inlet and the manifold regulator; and
a second heat exchanger of the plurality of heat exchangers between the manifold regulator and the compressor inlet.

12. The defueling system of claim 11 wherein the first heat exchanger, the manifold regulator, and the second heat exchanger form a closed system, the first heat exchanger and second heat exchanger being each being configured to reheat an antifreeze solution as the compressed gas changes pressure.

13. The defueling system of claim 1 wherein the defueling system comprises:
a defuel storage rundown valve;
a refuel valve;
a defuel valve;
a fuel demand valve,
wherein the defueling system is configured to close the defuel storage rundown valve and open or keep open the defuel valve when a gas pressure on a defuel line Dpsi is at or above a pressure greater than open setpoint Xpsi for setpoint time t.

14. The defueling system of claim 13 wherein system is configured to open the defuel storage rundown valve to the defueling storage tank if there is no demand source on the defueling system when defueling from a fuel source.

15. The defueling system of claim 13, wherein, when the defueling storage Spsi is equal or greater than a defuel rundown open setpoint Rpsi for time t, the defueling system is configured to open the defueling storage rundown valve and allow the fuel stored in the defueling storage tank to flow into the compressor inlet to be compressed to refuel the fuel demand source.

16. The defueling system claim of 1, wherein the defueling system is configured to vent some or all of the gas from the fuel source.

17. A method comprising:
connecting a compressed natural gas (CNG) tank of a CNG vehicle to a defuel inlet of a defueling system;
depressurizing the CNG being defueled from the CNG tank;
routing the defueled natural gas to a heat exchange system, wherein the heat exchange system is configured to prevent freezing during defueling and refueling; and
recompressing the decompressed natural gas and routing it to a refueling outlet to fuel a CNG demand source comprising the same or another compressed natural gas (CNG) tank of the same or another CNG vehicle, a defuel storage tank for storing defueled CNG, or both.

18. The method of claim 17 wherein the heat exchange system comprises a
a first heat exchanger of a plurality of the heat exchangers between the defuel inlet and a manifold regulator comprising an antifreeze tank and an antifreeze heater; and a second heat exchanger of the plurality of heat exchangers between the manifold regulator and a compressor inlet.

19. The method of claim 17 wherein the defueling system comprises:
a defuel storage rundown valve;
a defuel valve; and
and the method further comprises:
closing the defuel storage rundown valve and opening or keeping open the defuel valve when a gas pressure on a defuel line Dpsi is at or above a pressure greater than open setpoint Xpsi for setpoint time t.

20. The method of claim 19, the method comprising
when the defueling storage Spsi is equal or greater than a defuel rundown open setpoint Rpsi for time t, opening the defueling storage rundown valve and allowing the fuel stored in the defueling storage tank to flow into the compressor inlet to be compressed to refuel the CNG demand source.

* * * * *